(12) United States Patent
Islam et al.

(10) Patent No.: US 10,841,970 B2
(45) Date of Patent: Nov. 17, 2020

(54) BEAM MANAGEMENT FOR BEAM-SWEPT WAKEUP SIGNALS

(71) Applicant: QUALCOMM Incorporated, San Diego, CA (US)

(72) Inventors: Muhammad Nazmul Islam, Edison, NJ (US); Juergen Cezanne, Ocean Township, NJ (US); Ashwin Sampath, Skillman, NJ (US); Vasanthan Raghavan, West Windsor Township, NJ (US); Jianghong Luo, Skillman, NJ (US); Sundar Subramanian, San Diego, CA (US); Sumeeth Nagaraja, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/058,706

(22) Filed: Aug. 8, 2018

(65) Prior Publication Data

US 2019/0053321 A1 Feb. 14, 2019

Related U.S. Application Data

(60) Provisional application No. 62/544,751, filed on Aug. 11, 2017.

(51) Int. Cl.
*H04W 76/28* (2018.01)
*H04B 7/06* (2006.01)
(Continued)

(52) U.S. Cl.
CPC .......... *H04W 76/28* (2018.02); *H04B 7/0639* (2013.01); *H04B 7/088* (2013.01);
(Continued)

(58) Field of Classification Search
CPC .... H04W 76/28; H04W 72/042; H04L 69/324
See application file for complete search history.

(56) References Cited

U.S. PATENT DOCUMENTS

| | | | |
|---|---|---|---|
| 2011/0038271 A1* | 2/2011 | Shin | H04W 52/08 370/252 |
| 2014/0198696 A1* | 7/2014 | Li | H04W 52/0229 370/311 |

(Continued)

FOREIGN PATENT DOCUMENTS

WO WO-2017196611 A1 * 11/2017 ............ H04W 68/02

OTHER PUBLICATIONS

International Search Report and Written Opinion—PCT/US2018/046093—ISA/EPO—Oct. 31, 2018 (175814WO).

*Primary Examiner* — Siming Liu
(74) *Attorney, Agent, or Firm* — Linda G. Gunderson

(57) ABSTRACT

Methods, systems, and devices for wireless communication are described. A base station may initiate a beam management procedure, including reference signal transmission to a user equipment (UE) and receive beam training. A base station may configure a UE to monitor a set of beams for reference signals. Based on the received reference signals, the UE may optionally select one or more transmit beams for wakeup signal reception, and may transmit an indication of the selected beams to the base station. The base station may transmit a wakeup signal over the originally configured or the UE-selected transmit beams to initiate wake-up procedure at the UE. The base station and UE may subsequently perform a refined beam management procedure, providing a refined reference signal transmission from the base station. Based on the received transmission, the UE may select a refined beam for downlink transmissions.

26 Claims, 21 Drawing Sheets

(51) Int. Cl.
*H04B 7/08* (2006.01)
*H04L 5/00* (2006.01)
*H04L 29/08* (2006.01)
*H04W 72/04* (2009.01)
*H04W 72/08* (2009.01)
*H04W 88/02* (2009.01)
*H04W 88/08* (2009.01)

(52) U.S. Cl.
CPC .......... *H04L 5/0023* (2013.01); *H04L 5/0053* (2013.01); *H04L 69/324* (2013.01); *H04W 72/042* (2013.01); *H04W 72/046* (2013.01); *H04W 72/085* (2013.01); *H04W 88/02* (2013.01); *H04W 88/08* (2013.01)

(56) References Cited

U.S. PATENT DOCUMENTS

| | | | |
|---|---|---|---|
| 2015/0078189 A1* | 3/2015 | Kwon | H04W 52/0216 370/252 |
| 2017/0094576 A1* | 3/2017 | Kazmi | H04L 1/1887 |
| 2017/0134964 A1* | 5/2017 | Yu | H04B 7/0656 |
| 2019/0132099 A1* | 5/2019 | Wu | H04L 1/00 |

* cited by examiner

BEAM MANAGEMENT FOR BEAM-SWEPT WAKEUP SIGNALS

CROSS REFERENCES

The present Application for Patent claims the benefit of U.S. Provisional Patent Application No. 62/544,751 by ISLAM, et al., entitled "BEAM MANAGEMENT FOR BEAM-SWEPT WAKEUP SIGNALS," filed Aug. 11, 2017, assigned to the assignee hereof, and which is incorporated herein by reference in its entirety.

BACKGROUND

The following relates generally to wireless communication, and more specifically to beam management for beam-swept wakeup signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome the path losses at these frequencies. Due to the increased amount of path loss in mmW communication systems, transmissions from the base station and/or the UE may be beamformed.

A UE may operate in a discontinuous reception (DRX) mode (e.g., a connected DRX (C-DRX) mode) where the UE transitions between an active state (e.g., where the UE wakes up to determine if data is available for the UE) and a sleep state (e.g., where the UE shuts down various hardware/processes to conserve power). The UE may determine if data is available by monitoring a control channel, such as a physical downlink control channel (PDCCH). The PDCCH may carry or otherwise convey an indication that the base station has data ready to transmit to the UE. In a mmW wireless communication system, the mmW base station (e.g., a next generation nodeB (gNB)) may need to beam sweep the PDCCH transmissions to mitigate high path losses associated with mmW transmissions. This may result in the UE attempting to decode the PDCCH multiple times and/or wake up for a longer time period to receive and decode the PDCCH transmissions and/or allow for beam management. Power consumption at the UE using such techniques may be high.

SUMMARY

The described techniques relate to improved methods, systems, devices, or apparatuses that support discontinuous reception wake up procedures. Generally, the described techniques provide for the transmission of a beam-swept wakeup signal to a user equipment (UE) in a sleep state of a connected discontinuous reception (C-DRX) mode. For example, a base station may transmit a set of signals (e.g., reference signals, synchronization signals, etc.) using a beam sweeping configuration. In such cases, the UE may be configured by the base station to monitor the beams carrying the set of signals. Based on receiving the signals, the UE may optionally indicate a different set of beams to be used by the base station to transmit a wakeup signal. For instance, the UE may, through monitoring the set of beams, find that the quality of signals has not degraded, and the UE may refrain from transmitting an indication of a different set of beams. Alternatively, the quality of the set of signals sent on the set of beams may have been degraded, and the UE may select another set of beams for the transmission of the wakeup signal. In any case, the base station may transmit the wakeup signal on at least two beams of the configured set or of the set selected by the UE. The wakeup signal sent on either of the beams may be used by the UE to efficiently wake from a sleep state of the C-DRX mode.

After transmitting the wakeup signal, the base station may transmit a second set of signals (e.g., reference signals or synchronization signals, or a combination thereof) that may be used for hierarchical beam management. For instance, the base station may transmit the wakeup signal on multiple coarse beams. The base station may then transmit the second set of signals on another set of finer beams (e.g., using more beams than used for the wakeup signal transmission), and the UE may indicate at least one of the finer beams for a downlink transmission from the base station. Accordingly, the hierarchical beam management procedures may coherently use the wakeup signal to further refine a set of beams for the transmission of downlink data or control information.

A method of wireless communication is described. The method may include identifying that data is available to be transmitted to a UE that is operating in a DRX mode and transmitting, to the UE, a wakeup signal to wake the UE from a sleep state of the DRX mode, the wakeup signal transmitted using a first transmit beam and a second transmit beam of a first set of transmit beams in accordance with a beam sweeping configuration.

An apparatus for wireless communication is described. The apparatus may include means for identifying that data is available to be transmitted to a UE that is operating in a DRX mode and means for transmitting, to the UE, a wakeup signal to wake the UE from a sleep state of the DRX mode, the wakeup signal transmitted using a first transmit beam and a second transmit beam of a first set of transmit beams in accordance with a beam sweeping configuration.

Another apparatus for wireless communication is described. The apparatus may include a processor, memory in electronic communication with the processor, and instructions stored in the memory. The instructions may be operable to cause the processor to identify that data is available to be transmitted to a UE that is operating in a DRX mode and transmit, to the UE, a wakeup signal to wake the UE from a sleep state of the DRX mode, the wakeup signal transmitted using a first transmit beam and a second transmit beam of a first set of transmit beams in accordance with a beam sweeping configuration.

A non-transitory computer readable medium for wireless communication is described. The non-transitory computer-readable medium may include instructions operable to cause a processor to identify that data is available to be transmitted to a user equipment (UE) that is operating in a DRX mode and transmit, to the UE, a wakeup signal to wake the UE from a sleep state of the DRX mode, the wakeup signal transmitted using a first transmit beam and a second transmit beam of a first set of transmit beams in accordance with a beam sweeping configuration.

Some examples of the method, apparatus, and non-transitory computer-readable medium described above may further include processes, features, means, or instructions for configuring the UE to monitor the first set of transmit beams to receive a set of signals from the base station while operating in the DRX mode, the set of signals comprising reference signals, or synchronization signals, or a combination thereof.

In some examples of the method, apparatus, and non-transitory computer-readable medium described above, receiving, from the UE, an indication of a second set of transmit beams comprising a plurality of transmit beams selected by the UE based at least in part on the set of signals, wherein transmitting the wakeup signal comprises: transmitting the wakeup signal using a plurality of transmit beams of the second set of transmit beams based at least in part on the received indication.

In some examples of the method, apparatus, and non-transitory computer-readable medium described above, each of the second set of transmit beams may be different from each of the first set of transmit beams. Some examples of the method, apparatus, and non-transitory computer-readable medium described above may further include processes, features, means, or instructions for configuring the UE to transmit the indication of the second set of transmit beams at a predetermined periodicity.

Some examples of the method, apparatus, and non-transitory computer-readable medium described above may further include processes, features, means, or instructions for determining a link quality threshold to decode the wakeup signal. Some examples of the method, apparatus, and non-transitory computer-readable medium described above may further include processes, features, means, or instructions for configuring the UE to transmit the indication of the second set of transmit beams when a link quality of the first transmit beam or the second transmit beam of the first set of transmit beams fails to satisfy the determined link quality threshold.

In some examples of the method, apparatus, and non-transitory computer-readable medium described above, receiving the indication of the second set of transmit beams comprises: receiving a beam recovery signal that identifies the second set of transmit beams. In some examples of the method, apparatus, and non-transitory computer-readable medium described above, the reference signals comprise demodulation reference signals (DMRSs), tracking reference signals (TRSs), phase compensation reference signals (PC-RSs), or channel state information reference signals (CSI-RSs), or a combination thereof. In some examples of the method, apparatus, and non-transitory computer-readable medium described above, the synchronization signals comprise primary synchronization signals (PSSs), secondary synchronization signals (SSSs), physical broadcast channel (PBCH) signals, or a combination thereof.

Some examples of the method, apparatus, and non-transitory computer-readable medium described above may further include processes, features, means, or instructions for configuring the UE to monitor the first set of transmit beams to receive a set of signals from the base station while operating in the DRX mode, the set of signals comprising reference signals, or synchronization signals, or a combination thereof. Some examples of the method, apparatus, and non-transitory computer-readable medium described above may further include processes, features, means, or instructions for transmitting the set of signals using the first set of transmit beams in accordance with the beam sweeping configuration.

In some examples of the method, apparatus, and non-transitory computer-readable medium described above, the first transmit beam, or the second transmit beam, or both, may be a pseudo-omni beam. Some examples of the method, apparatus, and non-transitory computer-readable medium described above may further include processes, features, means, or instructions for identifying a plurality of transmit beams used to transmit a set of synchronization signals. Some examples of the method, apparatus, and non-transitory computer-readable medium described above may further include processes, features, means, or instructions for identifying at least the first transmit beam and the second transmit beam of the first set of transmit beams based at least in part on the identified plurality of transmit beams used to transmit the set of synchronization signals.

In some examples of the method, apparatus, and non-transitory computer-readable medium described above, the wakeup signal comprises a narrowband tone, or a UE-specific reference signal, or a physical downlink control channel (PDCCH) including a bit that indicates that the UE may be to wake up from the sleep state, or a combination thereof. In some examples of the method, apparatus, and non-transitory computer-readable medium described above, the DRX mode comprises a connected DRX (C-DRX) mode.

A method of wireless communication is described. The method may include receiving, from a base station while operating in a discontinuous reception (DRX) mode, a first set of signals in a first set of transmit beams and a second set of signals in a second set of transmit beams, wherein the first set of signals comprise reference signals or synchronization signals, or a combination thereof, selecting the second set of transmit beams based at least in part on the received first set of signals, the second set of transmit beams comprising two or more transmit beams, and the two or more transmit beams being different from the first set of transmit beams, and transmitting an indication of the selected second set of transmit beams to the base station.

An apparatus for wireless communication is described. The apparatus may include means for receiving, from a base station while operating in a discontinuous reception (DRX) mode, a first set of signals in a first set of transmit beams and a second set of signals in a second set of transmit beams, wherein the first set of signals comprise reference signals or synchronization signals, or a combination thereof, means for selecting the second set of transmit beams based at least in part on the received first set of signals, the second set of transmit beams comprising two or more transmit beams, and the two or more transmit beams being different from the first set of transmit beams, and means for transmitting an indication of the selected second set of transmit beams to the base station.

Another apparatus for wireless communication is described. The apparatus may include a processor, memory in electronic communication with the processor, and instructions stored in the memory. The instructions may be operable to cause the processor to receive, from a base station while operating in a discontinuous reception (DRX) mode, a first set of signals in a first set of transmit beams and a second set of signals in a second set of transmit beams, wherein the first set of signals comprise reference signals or synchronization signals, or a combination thereof, select the second set of transmit beams based at least in part on the received first set of signals, the second set of transmit beams comprising two or more transmit beams, and the two or more transmit beams being different from the first set of transmit beams, and transmit an indication of the selected second set of transmit beams to the base station.

A non-transitory computer readable medium for wireless communication is described. The non-transitory computer-readable medium may include instructions operable to cause a processor to receive, from a base station while operating in a discontinuous reception (DRX) mode, a first set of signals in a first set of transmit beams and a second set of signals in a second set of transmit beams, wherein the first set of signals comprise reference signals or synchronization signals, or a combination thereof, select the second set of transmit beams based at least in part on the received first set of signals, the second set of transmit beams comprising two or more transmit beams, and the two or more transmit beams being different from the first set of transmit beams, and transmit an indication of the selected second set of transmit beams to the base station.

Some examples of the method, apparatus, and non-transitory computer-readable medium described above may further include processes, features, means, or instructions for receiving a wakeup signal from the base station, the wakeup signal received using at least one transmit beam of the second set of transmit beams. Some examples of the method, apparatus, and non-transitory computer-readable medium described above may further include processes, features, means, or instructions for waking up from a sleep state of the DRX mode to receive data based at least in part on the received wakeup signal.

In some examples of the method, apparatus, and non-transitory computer-readable medium described above, the wakeup signal comprises a narrowband tone, or a UE-specific reference signal, or a PDCCH including a bit that indicates that the UE may be to wake up from the sleep state, or a combination thereof. Some examples of the method, apparatus, and non-transitory computer-readable medium described above may further include processes, features, means, or instructions for determining a signal quality associated with the received first set of signals, wherein identifying the second set of transmit beams may be based on a signal quality threshold.

In some examples of the method, apparatus, and non-transitory computer-readable medium described above, transmitting the indication of the selected second set of transmit beams comprises: transmitting a beam recovery signal that identifies the selected second set of transmit beams. In some examples of the method, apparatus, and non-transitory computer-readable medium described above, the reference signals comprise DMRSs, TRSs, PC-RSs, or CSI-RSs, or a combination thereof. In some examples of the method, apparatus, and non-transitory computer-readable medium described above, the synchronization signals comprise primary PSSs, SSSs, PBCH signals, or a combination thereof. In some examples of the method, apparatus, and non-transitory computer-readable medium described above, the DRX mode comprises a C-DRX mode.

A method of wireless communication is described. The method may include transmitting, to a UE that is operating in a DRX mode, a wakeup signal to wake the UE from a sleep state of the DRX mode, the wakeup signal transmitted using a first transmit beam and a second transmit beam of a first set of transmit beams in accordance with a beam sweeping configuration, transmitting a set of signals using a second set of transmit beams, the set of signals comprising reference signals, or synchronization signals, or a combination thereof, and receiving an indication of a transmit beam from the second set of transmit beams, the transmit beam selected by the UE.

An apparatus for wireless communication is described. The apparatus may include means for transmitting, to a UE that is operating in a DRX mode, a wakeup signal to wake the UE from a sleep state of the DRX mode, the wakeup signal transmitted using a first transmit beam and a second transmit beam of a first set of transmit beams in accordance with a beam sweeping configuration, means for transmitting a set of signals using a second set of transmit beams, the set of signals comprising reference signals, or synchronization signals, or a combination thereof, and means for receiving an indication of a transmit beam from the second set of transmit beams, the transmit beam selected by the UE.

Another apparatus for wireless communication is described. The apparatus may include a processor, memory in electronic communication with the processor, and instructions stored in the memory. The instructions may be operable to cause the processor to transmit, to a UE that is operating in a DRX mode, a wakeup signal to wake the UE from a sleep state of the DRX mode, the wakeup signal transmitted using a first transmit beam and a second transmit beam of a first set of transmit beams in accordance with a beam sweeping configuration, transmit a set of signals using a second set of transmit beams, the set of signals comprising reference signals, or synchronization signals, or a combination thereof, and receive an indication of a transmit beam from the second set of transmit beams, the transmit beam selected by the UE.

A non-transitory computer readable medium for wireless communication is described. The non-transitory computer-readable medium may include instructions operable to cause a processor to transmit, to a UE that is operating in a DRX mode, a wakeup signal to wake the UE from a sleep state of the DRX mode, the wakeup signal transmitted using a first transmit beam and a second transmit beam of a first set of transmit beams in accordance with a beam sweeping configuration, transmit a set of signals using a second set of transmit beams, the set of signals comprising reference signals, or synchronization signals, or a combination thereof, and receive an indication of a transmit beam from the second set of transmit beams, the transmit beam selected by the UE.

Some examples of the method, apparatus, and non-transitory computer-readable medium described above may further include processes, features, means, or instructions for determining a beam management configuration for the UE to use to receive the second set of transmit beams. Some examples of the method, apparatus, and non-transitory computer-readable medium described above may further include processes, features, means, or instructions for transmitting at least a part of the beam management configuration with the wakeup signal.

Some examples of the method, apparatus, and non-transitory computer-readable medium described above may further include processes, features, means, or instructions for receiving an indication of the second set of transmit beams from the UE. Some examples of the method, apparatus, and non-transitory computer-readable medium described above may further include processes, features, means, or instructions for transmitting the set of signals using the second set of transmit beams based at least in part on the received indication of the second set of transmit beams.

Some examples of the method, apparatus, and non-transitory computer-readable medium described above may further include processes, features, means, or instructions for encoding the set of signals using a code rate that may be higher than a code rate used to encode the wakeup signal. Some examples of the method, apparatus, and non-transitory computer-readable medium described above may further include processes, features, means, or instructions for transmitting, using the indicated transmit beam, a PDCCH, or a resource grant, or downlink data, or a combination thereof.

In some examples of the method, apparatus, and non-transitory computer-readable medium described above, a number of the second transmit beams may be greater than a number of the first set of transmit beams. In some examples of the method, apparatus, and non-transitory computer-readable medium described above, the reference signals comprise DMRSs, TRSs, PC-RSs, or CSI-RSs, or a combination thereof. In some examples of the method, apparatus, and non-transitory computer-readable medium described above, the synchronization signals comprise PSSs, SSSs, PBCH signals, or a combination thereof.

A method of wireless communication is described. The method may include receiving, while operating in a DRX mode, a wakeup signal to wake the UE from a sleep state of the DRX mode, the wakeup signal transmitted by a base station using a first transmit beam and a second transmit beam of a first set of transmit beams in accordance with a beam sweeping configuration, receiving, based at least in part on receiving the wakeup signal, a set of signals transmitted by the base station using a second set of transmit beams, the set of signals comprising reference signals, or synchronization signals, or a combination thereof, selecting a transmit beam from the second set of transmit beams for the UE to use to receive downlink transmissions from the base station, and transmitting an indication of the selected transmit beam to the base station.

An apparatus for wireless communication is described. The apparatus may include means for receiving, while operating in a DRX mode, a wakeup signal to wake the UE from a sleep state of the DRX mode, the wakeup signal transmitted by a base station using a first transmit beam and a second transmit beam of a first set of transmit beams in accordance with a beam sweeping configuration, means for receiving, based at least in part on receiving the wakeup signal, a set of signals transmitted by the base station using a second set of transmit beams, the set of signals comprising reference signals, or synchronization signals, or a combination thereof, means for selecting a transmit beam from the second set of transmit beams for the UE to use to receive downlink transmissions from the base station, and means for transmitting an indication of the selected transmit beam to the base station.

Another apparatus for wireless communication is described. The apparatus may include a processor, memory in electronic communication with the processor, and instructions stored in the memory. The instructions may be operable to cause the processor to receive, while operating in a DRX mode, a wakeup signal to wake the UE from a sleep state of the DRX mode, the wakeup signal transmitted by a base station using a first transmit beam and a second transmit beam of a first set of transmit beams in accordance with a beam sweeping configuration, receive, based at least in part on receiving the wakeup signal, a set of signals transmitted by the base station using a second set of transmit beams, the set of signals comprising reference signals, or synchronization signals, or a combination thereof, select a transmit beam from the second set of transmit beams for the UE to use to receive downlink transmissions from the base station, and transmit an indication of the selected transmit beam to the base station.

A non-transitory computer readable medium for wireless communication is described. The non-transitory computer-readable medium may include instructions operable to cause a processor to receive, while operating in a DRX mode, a wakeup signal to wake the UE from a sleep state of the DRX mode, the wakeup signal transmitted by a base station using a first transmit beam and a second transmit beam of a first set of transmit beams in accordance with a beam sweeping configuration, receive, based at least in part on receiving the wakeup signal, a set of signals transmitted by the base station using a second set of transmit beams, the set of signals comprising reference signals, or synchronization signals, or a combination thereof, select a transmit beam from the second set of transmit beams for the UE to use to receive downlink transmissions from the base station, and transmit an indication of the selected transmit beam to the base station.

Some examples of the method, apparatus, and non-transitory computer-readable medium described above may further include processes, features, means, or instructions for decoding the set of signals, wherein the set of signals may be encoded using a code rate that may be higher than a code rate used to encode the wakeup signal. Some examples of the method, apparatus, and non-transitory computer-readable medium described above may further include processes, features, means, or instructions for determining a signal quality associated with the decoded set of reference signals, wherein selecting the transmit beam may be based on the a signal quality threshold.

Some examples of the method, apparatus, and non-transitory computer-readable medium described above may further include processes, features, means, or instructions for receiving, as part of the wakeup signal, at least a part of a beam management configuration used to select the transmit beam from the second set of transmit beams. Some examples of the method, apparatus, and non-transitory computer-readable medium described above may further include processes, features, means, or instructions for receiving the downlink transmissions transmitted by the base station using the selected transmit beam, wherein the downlink transmissions comprise a PDCCH, or a resource grant, or downlink data, or a combination thereof.

In some examples of the method, apparatus, and non-transitory computer-readable medium described above, the reference signals comprise DMRSs, TRSs, PC-RSs, or CSI-RSs, or a combination thereof. In some examples of the method, apparatus, and non-transitory computer-readable medium described above, the synchronization signals comprise PSSs, SSSs, PBCH signals, or a combination thereof. In some examples of the method, apparatus, and non-transitory computer-readable medium described above, a number of the second transmit beams may be greater than a number of the first set of transmit beams.

A method of wireless communication is described. The method may include receiving, from a base station, a first set of signals in a first set of transmit beams and a second set of signals in a second set of transmit beams, wherein the first set of signals comprise reference signals, or synchronization signals, or a combination thereof; selecting a transmit beam from the second set of transmit beams based at least in part on the received first set of signals; and transmitting an indication of the selected transmit beam from the second set of transmit beams to the base station.

An apparatus for wireless communication is described. The apparatus may include means for receiving, from a base station, a first set of signals in a first set of transmit beams and a second set of signals in a second set of transmit beams, wherein the first set of signals comprise reference signals, or synchronization signals, or a combination thereof; selecting a transmit beam from the second set of transmit beams based at least in part on the received first set of signals; and transmitting an indication of the selected transmit beam from the second set of transmit beams to the base station.

Another apparatus for wireless communication is described. The apparatus may include a processor, memory in electronic communication with the processor, and instructions stored in the memory. The instructions may be operable to cause the processor to receive, from a base station, a first set of signals in a first set of transmit beams and a second set of signals in a second set of transmit beams, wherein the first set of signals comprise reference signals, or synchronization signals, or a combination thereof; select a transmit beam from the second set of transmit beams based at least in part on the received first set of signals; and transmit an indication of the selected transmit beam from the second set of transmit beams to the base station.

A non-transitory computer readable medium for wireless communication is described. The non-transitory computer-readable medium may include instructions operable to cause a processor to receive, from a base station, a first set of signals in a first set of transmit beams and a second set of signals in a second set of transmit beams, wherein the first set of signals comprise reference signals, or synchronization signals, or a combination thereof; select a transmit beam from the second set of transmit beams based at least in part on the received first set of signals; and transmit an indication of the selected transmit beam from the second set of transmit beams to the base station.

In some examples of the method, apparatus, and non-transitory computer-readable medium described above, the reference signals comprise transmitting the indication of the selected transmit beam comprises transmitting a beam recovery signal that identifies the selected transmit beam.

Some examples of the method, apparatus, and non-transitory computer-readable medium described above may further include processes, features, means, or instructions for determining, for each transmit beam of the first set of transmit beams, a signal quality associated with the received first set of signals, where the transmit beam is selected based on the signal quality being below a signal quality threshold.

Some examples of the method, apparatus, and non-transitory computer-readable medium described above may further include processes, features, means, or instructions for receiving, using the selected transmit beam from the second set of transmit beams, signals from the base station in response to the transmitted indication.

In some examples of the method, apparatus, and non-transitory computer-readable medium described above, the reference signals comprise demodulation reference signals (DMRSs), tracking reference signals (TRSs), phase compensation reference signals (PC-RSs), or channel state information reference signals (CSI-RSs), or a combination thereof; and the synchronization signals comprise primary synchronization signals (PSSs), secondary synchronization signals (SSSs), demodulation reference signals (DMRSs), physical broadcast channel (PBCH) signals, or a combination thereof.

In some examples of the method, apparatus, and non-transitory computer-readable medium described above, the first set of signals comprise channel state information reference signals (CSI-RSs), the method further comprising, and the method, apparatus, and non-transitory computer-readable medium described above may further include processes, features, means, or instructions for receiving a configuration of periodic CSI-RS resources; and receiving at least one of the CSI-RSs during a CSI-RS resource of the periodic CSI-RS resources.

Some examples of the method, apparatus, and non-transitory computer-readable medium described above may further include processes, features, means, or instructions for determining that a signal quality associated with the received at least one CSI-RS is below a signal quality threshold, wherein selecting the second set of transmit beams is based at least in part on the determination; and receiving a signal from the base station using at least one transmit beam of the second set of transmit beams based at least in part on the determination.

DETAILED DESCRIPTION

Figure 1:
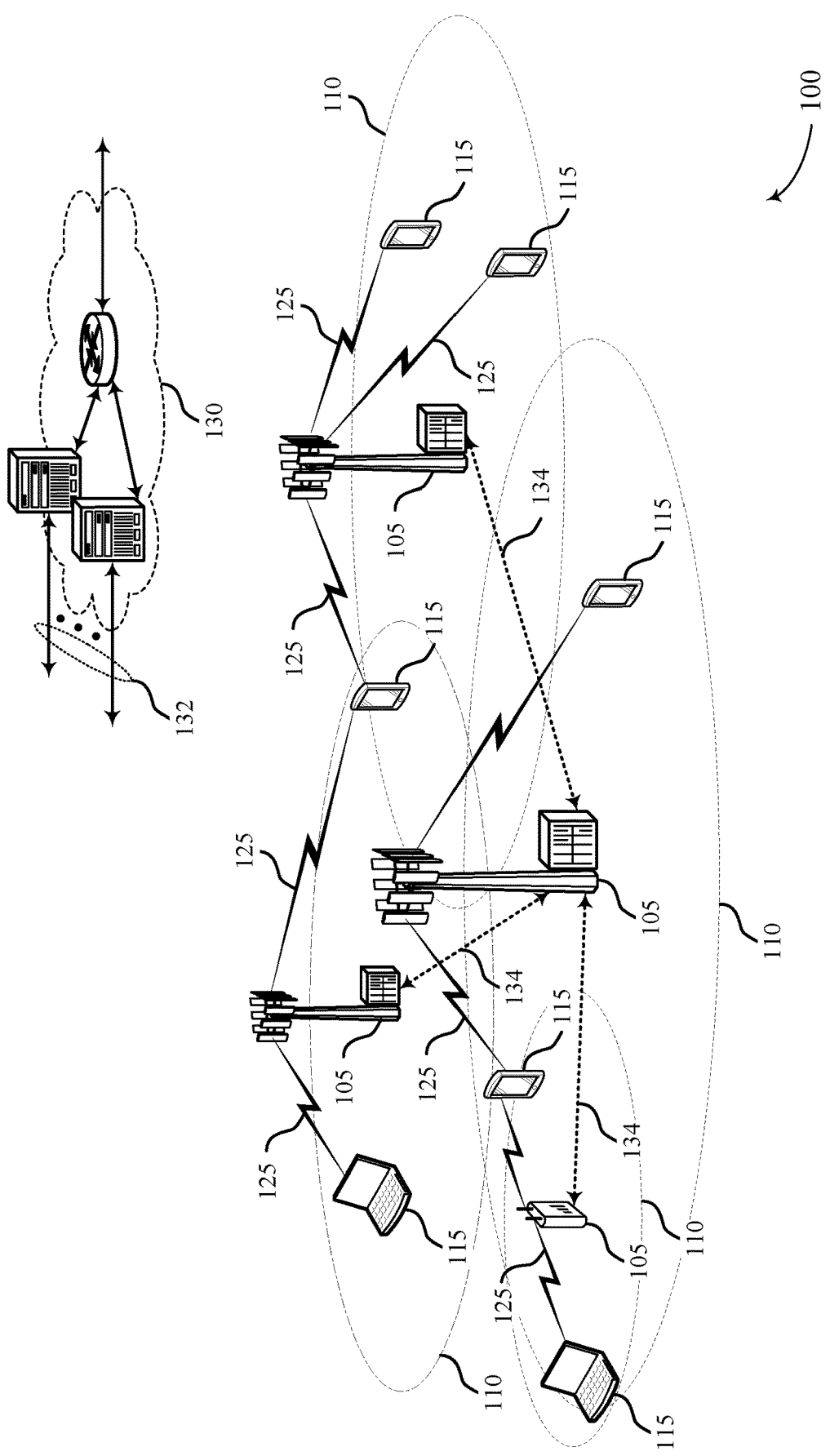
FIG. 1 illustrates an example of a system for wireless communication that supports beam management in accordance with aspects of the present disclosure.

A wireless device may implement a discontinuous reception (DRX) cycle to enable the efficient use of battery power for reception of downlink (DL) transmissions. A base station and a user equipment (UE) may establish a radio resource control (RRC) connection and the UE may enter a sleep state when not actively communicating. For example, during RRC connection establishment, a DRX configuration, including a DRX-On cycle and DRX-Off cycle duration, may be configured in an RRC connection setup request or an RRC connection reconfiguration request. The DRX configuration may determine how frequently the UE is scheduled to wake-up and receive DL data in accordance with the configured DRX cycle durations.

Some wireless communications systems may support beamformed transmissions between the base station and the UE. For instance, a wireless communications system may operate in mmW frequency ranges (e.g., 28 GHz, 40 GHz, 60 GHz, etc.). Wireless communications at mmW frequencies may be associated with increased signal attenuation (e.g., path loss), which may be influenced by various factors, such as temperature, barometric pressure, diffraction, etc. As a result, signal processing techniques, such as beamforming, may be used to coherently combine energy and overcome path losses at these frequencies. A base station may use a number of antenna ports associated with rays of antennas for emitting directional receive beams of the base station and one or more beam reference signals (BRSs) for beamformed DL transmissions. Similarly, a UE may utilize beamforming for emitting directional receive beams of the UE and for uplink (UL) transmission to the base station. Accordingly, both the UE and base station may use beamforming techniques for wakeup signal reception and transmission over one or more coarse transmit beams, and preemptive to a beam management procedure for refined transmit beam physical downlink control channel (PDDCH) reception and transmission, respectively.

Beamformed (e.g., beam swept) data transmission and reception between the UE and base station, in accordance with a DRX configuration at the UE, may include procedures to establish beam selection during wakeup signal procedure, and beam refinement prior to physical downlink control channel (PDCCH) transmission. The wakeup signal may initiate a DRX-On cycle at the UE without including resource allocation or grant information. As a result, the wakeup signal may save decoding resources at the UE and reduce power consumption in comparison to control channel mechanisms. For example, the base station may transmit one or more beam-swept reference signals to the UE as at least a pre-emptive indication for subsequent wakeup signal transmission. In some cases, each of the reference signals may contain one or more synchronization signal (SS) bursts, channel state information reference signal (CSI-RS) bursts, or both. In other cases, each of the reference signals may contain one or more SS bursts with a subsequent beam-swept paging transmission distinct from CSI-RS transmission and quasi co-located (QCLed) with the antenna resources of the one or more SS bursts.

The UE may be pre-configured to monitor one or more coarse transmit beams for PDCCH decoding and data reception. The UE may receive the beam-swept reference signal transmission during the associated transmission time interval (TTI) duration(s) (e.g., symbol, slot) of each transmit beam. The UE may evaluate and decode the reference signal transmission over one or more pre-configured transmit beams of transmission, and evaluate the signal quality individually on the pre-configured beams, in a hierarchical manner. In the case that at least one of the pre-configured beams is sufficient, the UE may forgo a beam recovery signal transmission. Alternatively, the UE may locate alternative beams of the beam sweep, or sufficient quality, and provide an UL beam recovery signal transmission over the located beams. The beam recovery signal transmission may convey an indication of the receive beam and/or beam management transmission beam index at the UE.

The base station may configure UL resources for beam recovery signal reception. The configuration may include training one or more receive beam sweeps. In some cases, the base station may not receive a beam recovery signal from the UE, and may transmit the wakeup signal for the UE over the pre-configured transmit beams. Alternatively, the base station may receive a beam recovery signal from the UE, and transmit the wakeup signal over the one or more transmit beams as identified by the beam recovery signal.

The UE may receive the wakeup signal from the base station and initiate a DRX-On cycle. The base station may then receive a refined reference signal transmission over one or more refined transmit beams associated with the coarse beams of the wakeup signal transmission. The refined beams may represent a higher level of granularity within the frequency range supported by the coarse transmit beams of the preceding DL transmissions. The UE may then transmit a beam recovery signal on a selected refined transmit beam directed to the base station. The beam recovery signal may be frequency and/or time multiplexed with additional signaling (e.g., random channel (RACH) signaling).

The base station may receive the beam recovery signal from the UE during the associated transmission time interval (TTI) duration(s) (e.g., symbol, slot) of the refined transmit beam. Based on the symbol period of the received signal, the base station may identify the refined transmit beam for DL data transmission and directly transmit full PDCCH and DL traffic to the UE over the transmit beam. The described methods may allow the UE to improve message throughput between the UE and the base station. Additionally, through the use of one or more wakeup signal transmission, the UE may refrain from a full PDCCH decoding for wake-up procedure, thereby enhancing power use at the UE and extending battery life.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Aspects of the disclosure are initially described in the context of a wireless communications system. Aspects of the disclosure are further illustrated by and described with reference to apparatus diagrams, system diagrams, and flowcharts that relate to beam management for beam-swept wakeup signals.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

PDCCH carries downlink control information (DCI) in control channel elements (CCEs), which may consist of nine logically contiguous resource element groups (REGs), where each REG contains four resource elements (REs). DCI includes information regarding DL scheduling assignments, uplink resource grants, transmission scheme, uplink power control, HARQ information, modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a C-RNTI and CRC bits attached to each DCI may be scrambled based on the C-RNTI. To reduce power consumption and overhead at the user equipment, a limited set of control channel element (CCE) locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs 115 served by a base station 105 and may include information such as paging information, system information, random access procedures and the like. The UE-specific search space may include user-specific control information. CCEs may be indexed, and the common search space may start from, for example, CCE 0. The starting index for a UE-specific search space may depend on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

Synchronization (e.g., cell acquisition) may be performed using synchronization signals or channels transmitted by a network entity (e.g., a base station 105). In some cases, a base station 105 may transmit synchronization signal (SS) blocks (which may be referred to as SS bursts) containing discovery reference signals. For example, SS blocks may include a primary synchronization signal (PSS), a secondary synchronization signal (SSS), a physical broadcast channel (PBCH), or other synchronization signals (e.g., a tertiary synchronization signal (TSS)). In some examples, the signals included in an SS block may include a PSS, an SSS, a PBCH, and/or other synchronization signals that are time division multiplexed. For example, the signals included in an SS block may include a time division multiplexed first PBCH, SSS, second PBCH, and PSS (transmitted in the indicated order), or a time division multiplexed first PBCH, SSS, PSS, and second PBCH (transmitted in the indicated order), etc. In other examples, PBCH transmissions may be transmitted in a subset of SS block time resources (e.g., in two symbols of an SS block), and synchronization signals (e.g., primary synchronization signal (PSS) and secondary synchronization signal (SSS)) may be transmitted in another subset of SS block time resources. Furthermore, in deployments that use millimeter wave (mmW) transmission frequencies, multiple SS blocks may be transmitted in different directions using beam sweeping in a SS burst, and SS bursts may be periodically transmitted according to a SS burst set. In cases where a base station 105 may transmit omnidirectionally, a SS block may be periodically transmitted according to a configured periodicity.

For example, a base station 105 may transmit multiple instances of an SS block, on different beams, during a periodic broadcast channel transmission time interval (BCH TTI). In other cases, a base station 105 may transmit multiple instances of a SS block on a same beam, or in an omnidirectional manner, during a periodic BCH TTI. A UE 115 attempting to access a wireless network may perform an initial cell search by detecting a PSS from a base station 105. The PSS may enable synchronization of symbol timing and may indicate a physical layer identity value. The PSS may be utilized to acquire timing and frequency as well as a physical layer identifier. The UE 115 may then receive an SSS. The SSS may enable radio frame synchronization, and may provide a cell group identity value. The cell group identity value may be combined with the physical layer identifier to form the physical cell identifier (PCID), which identifies the cell. The SSS may also enable detection of a duplexing mode and a cyclic prefix (CP) length. An SSS may be used to acquire other system information (e.g., subframe index). The PBCH may be used to acquire additional system information needed for acquisition (e.g., bandwidth, frame index, etc.). In some cases, the PBCH may carry master information block (MIB) and one or more system information blocks (SIBS) for a given cell.

Because a base station 105 may not know the locations of devices attempting to synchronize with a cell of the base station, SS blocks may be successively transmitted in a beam swept manner (e.g., across multiple symbol periods). In some cases, a base station 105 may transmit the SS blocks using multiple transmit beams. A UE 115 may receive one or more of the SS blocks and determine a suitable downlink beam pair (e.g., based on a signal quality of the SS block being greater than a threshold). However, the beams over which the SS blocks are transmitted may be relatively coarse (e.g., broad). Accordingly, communications between the UE 115 and base station 105 may benefit from beam refinement, in which narrower uplink and downlink receive and transmit beams are selected. The width of a given beam (e.g., a narrow beam, a broad beam, etc.) may be modified by adjusting weighting of one or more of the elements in a transmitting or receiving antenna array. Such adjustments may be empirically determined by a receiving device (e.g., based on measurements of one or more reference signals). Each UE 115 attempting to access a given cell may receive a set of downlink reference signals and transmit a set of uplink reference signals to enable such beam refinement.

In some cases, a UE 115 receives an SS block may perform a cell measurement on the SS block, and may also acquire a network associated with a base station that transmitted the SS block. To determine a beam on which the SS block is transmitted, or to determine a timing of the SS block within a sequence of SS blocks (and in some cases, to fully determine the timing of the SS block or a synchronization signal therein), a UE 115 may have to decode a PBCH within the SS block and obtain an SS block index from the SS block (e.g., because the SS block index may convey a beam index associated with the SS block and/or the location of the SS block within a sequence of SS blocks).

In some cases, a base station 105 may transmit a wakeup signal to a UE 115, based at least in part on transmitted parameters of a background beam management procedure. Parameters of the wakeup signal may include a digital sequence or code to distinguish the wake-up signal from ambient radio transmissions or other interference. The wake-up signal may include one or more pseudo-omni beams for transmission, and additionally or alternatively, may consist of a number of beams equivalent to the beam cardinality for SS burst transmission. Additionally, the wake-up signal may include instructions for initiating wake-up procedure, without additional resource allocation or grant payloads. In some cases, the wake-up signal may consist of a narrowband tone. The UE 115 may determine the presence or absence of the narrowband tone through an energy detection via an energy detector. In other cases, the wake-up signal may consist of a UE specific reference signal directed to the UE 115. The UE 115 may descramble the tones of the reference signal transmission according to a correlator. In other cases, the wake-up signal may consist of a narrowband PDCCH signal conveyed through a specific search space indicated to the UE 115. The one or more wake-up signal implementations may conserve decoding resources at the UE 115 and therefore reduce power consumption.

In some cases, a UE 115 may monitor a communication link 125 continuously for an indication that the UE 115 may receive data. In other cases (e.g., to conserve power and extend battery life) a UE 115 may be configured with a DRX cycle. A DRX cycle consists of an "On Duration" when the UE 115 may monitor for control information (e.g., on PDCCH) and a "DRX period" when the UE 115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH during the On Duration. While monitoring PDCCH for a scheduling message, the UE 115 may initiate a "DRX Inactivity Timer." If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer." When the DRX Short Cycle Timer expires, the UE 115 may resume a long DRX cycle.

In wireless communications system 100, devices may be able to communicate over multiple portions of a system bandwidth at the same time. Such a configuration may improve throughput for the communications or otherwise benefit the system. However, because transmissions over the different bandwidth portions may experience different paths (e.g., may be transmitted from different antennas, may experience different degrees of path loss, may be received over different antennas, etc.), a receiving device may have to process the transmissions independently (e.g., may not be able to exploit signal processing of an antenna port on one sub-band to facilitate processing of a quasi co-located (QCLed) antenna port on another sub-band). In other cases, two or more antenna ports may be assumed to have a QCL relationship. That is, a UE 115 may be able to derive the properties of a first channel (e.g., delay spread, Doppler spread, frequency shift, average power, etc.) transmitted on a first antenna port from measurements made on a second channel transmitted on a second antenna port. Furthermore, a base station 105 may signal an indication of a QCL relationship (e.g., a spatial relationship, etc.) between the two portions of bandwidth (e.g., which may be referred to as carriers or sub-bands herein) to allow a UE 115 to transmit (or receive) a second signal over a second portion of the bandwidth based at least in part on processing of a first signal received over the first portion of the bandwidth. In some cases, exploiting QCL relationships (or reciprocal QCL relationships) may reduce overhead for a wireless system.

Wireless communications system 100 may support C-DRX wake-up procedure over mmW frequency band resources. Each of the base stations 105 and UEs 115 may use a plurality of antenna ports associated with rays to emit one or more transmit beams (e.g., BRSs for beamformed (e.g., beam sweep) data transmission and reception. For example, a base station 105 may use beamforming techniques for downlink (DL) reference signal, wakeup signal, PDCCH, and physical downlink shared channel (PDSCH) transmission to one or more configured UEs 115. Similarly, the UEs 115 may implement beamforming techniques for receive beam training, DL transmit beam selection, and UL transmission including beam recovery signal transmission.

Each of the one or more UEs 115 within wireless communications system 100 may be camped on a geographic coverage area 110 associated with a base station 105. The one or more UEs 115 may establish an RRC connection with the associated base station 105. During RRC connection establishment, one or more UEs 115 may implement a DRX configuration to enable efficient use of battery power for reception of DL transmissions. The DRX configuration, including a DRX-On cycle and DRX-Off cycle duration, may be configured at the UE 115 via an RRC connection setup request of RRC connection reconfiguration request. The DRX configuration may determine how frequently the one or more UEs 115 are scheduled to wake-up and receive DL data in accordance with the configured DRX cycle durations.

Figure 2A:
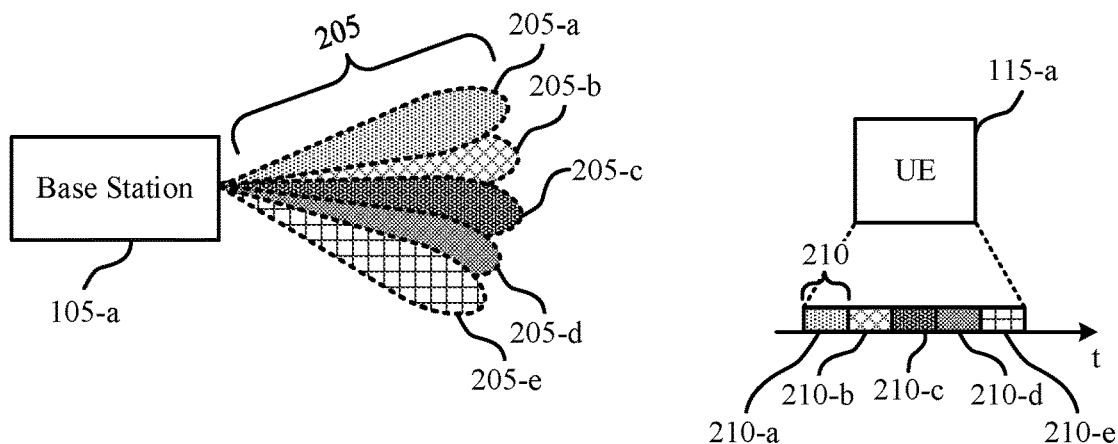
FIGS. 2A through 2C illustrates an example of a wireless communications system that supports beam management for beam-swept wakeup signals in accordance with aspects of the present disclosure.
Figure 2B:
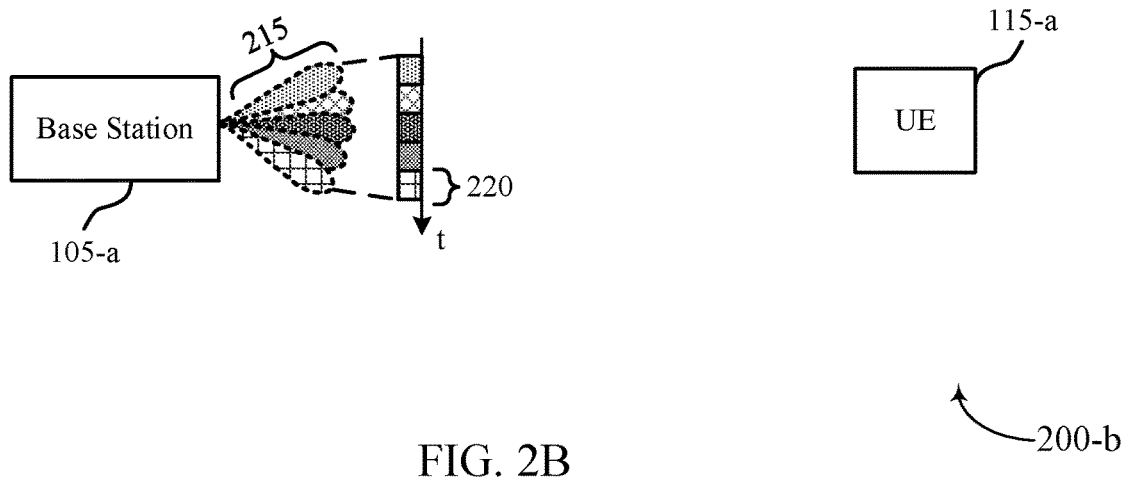
Figure 2C:
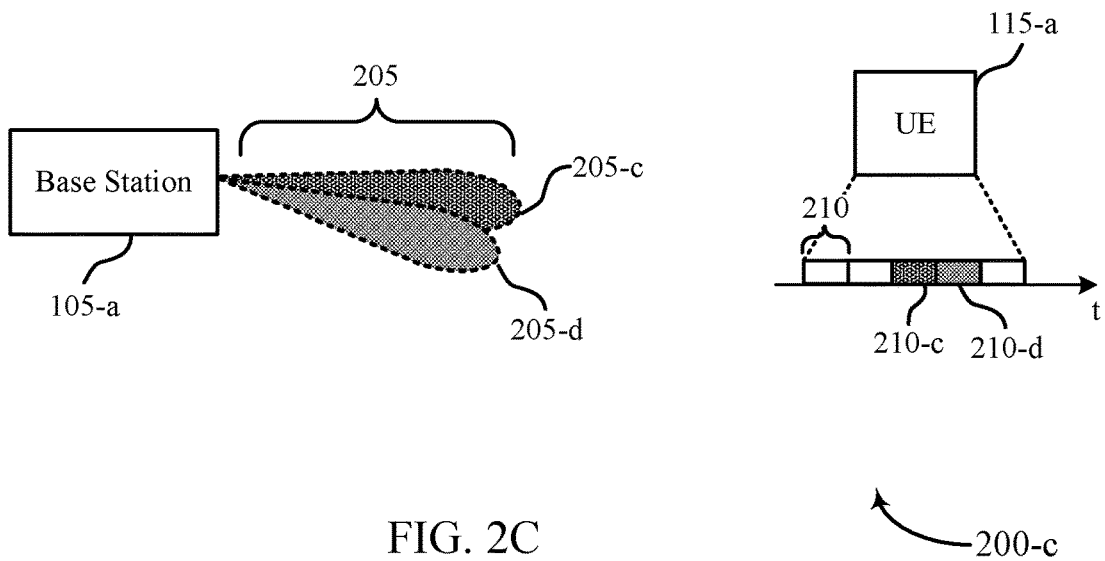

FIGS. 2A through 2C illustrate an example of a wireless communications system 200-a, 200-b, and 200-c that supports beam management for beam-swept wakeup signals in accordance with various aspects of the present disclosure. In some examples, wireless communications system 200-a through 200-c may implement aspects and features of wireless communications system 100. For example, wireless communications system 200-a through 200-c includes base station 105-a and UE 115-a. Base station 105-a may be an example of a base station 105 described with reference to FIG. 1, and may perform receive beam refinement, as well as beam-swept DL reference signal and wakeup signal transmission. UE 115-a may be an example of UE 115 described with reference to FIG. 1, and may perform receive beam refinement and transmit UL beam recovery signaling. UE 115-a may implement a DRX configuration in accordance with a RRC connection establishment, and perform scheduled DRX-On cycle durations for monitoring PDCCH subframes over system resources.

As illustrated in FIG. 2A, base station 105-a may implement procedures to convey one or more reference signal indications and wakeup signal transmission to UE 115-a. Base station 105-a may transmit the one or more reference signals to UE 115-a as at least a preemptive indication for a subsequent wakeup signal transmission over configured coarse transmit beams. In such cases, base station 105-a may transmit the reference signals via a plurality of transmit beams 205 (e.g., including BRSs contained within one or more beam sweep transmissions). Each transmit beam 205 may correspond to a TTI 210. For example, first transmit beam 205-a may correspond to first TTI 210-a, second transmit beam 205-b may correspond to second TTI 210-b, and so on. The reference signals may provide at least a reference point for downlink power over channel resources.

Additionally, the reference signals may be specific to UE 115-a or specific to geographic coverage area 110-a camped on by UE 115-a.

In some cases, each of the reference signals may contain one or more SS bursts (or SS blocks), tracking reference signal (TRS) bursts, phase compensation reference signal (PC-RS) bursts, channel state information reference signal (CSI-RS) bursts, or any combination thereof. Each of the bursts may have a configurable periodicity (e.g., 5, 10, 20, 40, 80, 160 ms). The SS bursts may be independent of the channel bandwidth and contain one or more PSS symbols, SSS symbols, and PBCH symbols. For example, a single SS burst may contain one PSS symbol, one SSS symbol, and two PBCH symbols containing demodulation reference signal (DMRS) sequences.

In other cases, each of the reference signals may contain one or more SS bursts with a subsequent beam-swept paging transmission distinct from CSI-RS transmission and QCLed with the antenna resources of the one or more SS bursts. A quasi co-location relationship between one or more beam transmissions may refer to a spatial relationship between the antenna ports (and the corresponding signaling beams) of the respective transmissions. For example, one or more antenna ports may be implemented by base station 105-a for transmitting at least one or more reference signals and command information transmissions (e.g., C-RNTI) to UE 115-a. However, the channel properties of the signals sent via the different antenna ports may be interpreted to be the same (e.g., despite the signals being transmitting from different antenna ports), and the antenna ports (and the respective beams) may be determined to be QCLed. In such cases, UE 115-a may have respective antenna ports to emit receive beams used for receiving the QCLed transmissions (e.g., reference signal, C-RNTI). The SS bursts may contain one or more PSS, SSS, and PBCH symbols, and the PBCH symbol may contain DMRS sequences. Base station 105-a may configure the paging transmission such that the transmission is multiplexed with one or more SS bursts or schedule the paging transmission as subsequent indication following a SS burst transmission.

UE 115-a may receive the reference signal transmission over a set of transmission time interval (TTI) duration(s) (e.g., symbol, slot) 210. Each TTI 210 may correspond to a transmit beam of the received reference signal transmission. In some cases, UE 115-a may be pre-configured to individually monitor one or more coarse transmit beams of the DL transmission sequentially, for PDCCH decoding and data reception. UE 115-a may sequentially evaluate and decode the transmission during the TTIs 210 associated with each pre-configured coarse transmit beam 205 and evaluate the signal quality of each pre-configured beam, in a hierarchical manner. For example, in some cases, UE 115-a may evaluate an initial pre-configured transmit beam (e.g., primary transmit beam) and determine the signal quality of the beam is sufficient. Based at least in part on the transmit beam sufficiency, UE 115-a may opt to forgo additional transmit beam evaluation and suspend beam recovery signal transmission to the base station. In other cases, UE 115-a may evaluate the initial pre-configured transmit beam (e.g., primary transmit beam) and determine the link quality of the primary beam is degraded below a pre-configured threshold. UE 115-a may then evaluate a subsequent pre-configured transmit beam (e.g., secondary transmit beam) and determine the signal quality of the secondary beam is sufficient. Similarly, UE 115-a may opt to forgo additional transmit beam evaluation and suspend beam recovery signal transmission to the base station.

As illustrated in FIG. 2B, base station 105-a may train one or more receive beams 215 for UL beam recovery signal reception. The receive beams 215 may be emitted in a beam-swept manner, each receive beam may be associated with a TTI 220. Based at least in part on the forgoing of a beam recovery signal transmission at UE 115-a, base station 105-a may not receive UL signaling from UE 115-a over a specified duration. Based at least in part on the absence of a beam recovery signal reception, base station 105-a may maintain the pre-configured transmit beams of UE 115-a for wakeup signal transmission.

As illustrated in FIG. 2C, base station 105-a may transmit the wakeup signal to UE 115-a via the coarse transmit beams 205. UE 115-a may receive the selected coarse beams 205 and decode and interpret the wakeup signal transmission within the corresponding TTI 210 associated with the preferred transmit beam 205. For example, UE 115-a may decode and interpret the wakeup signal transmission during third TTI 210-c and fourth TTI 210-d based on identifying third transmit beam 205-c and fourth transmit beam 205-d as preferred transmit beams. UE 115-a may interpret the reception as a wakeup signal indication, and initiate a DRX-On configuration for subsequent PDCCH and DL data transmission.

Figure 3A:
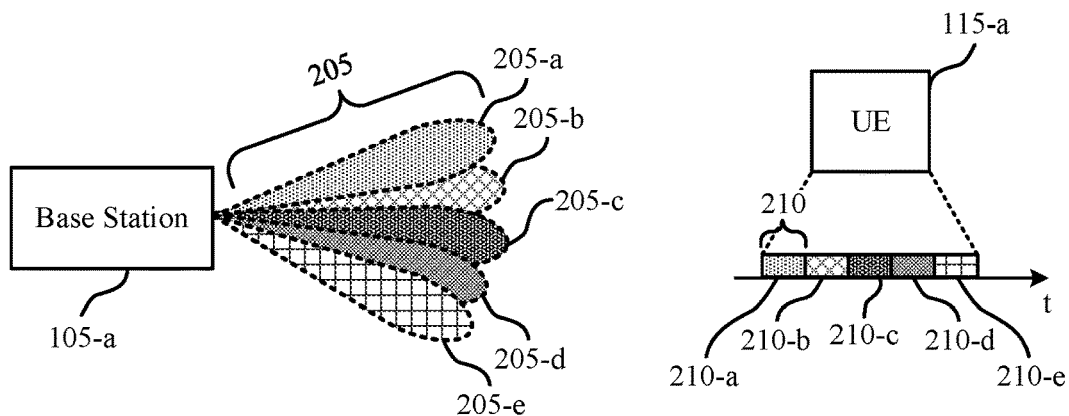
FIGS. 3A through 3C illustrates an example of a wireless communications system that supports beam management for beam-swept wakeup signals in accordance with aspects of the present disclosure.
Figure 3B:
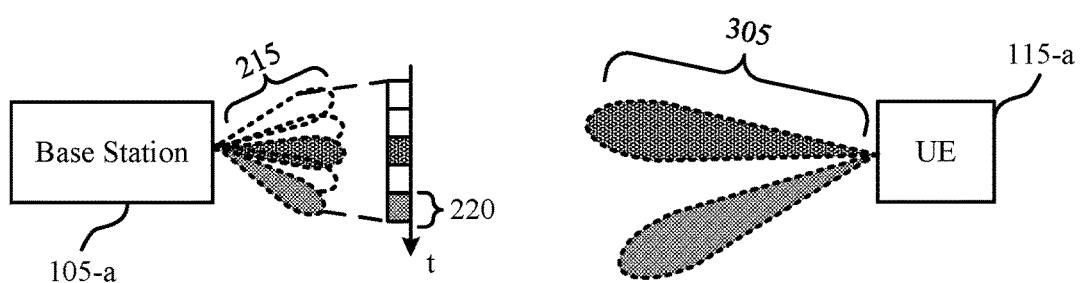
Figure 3C:
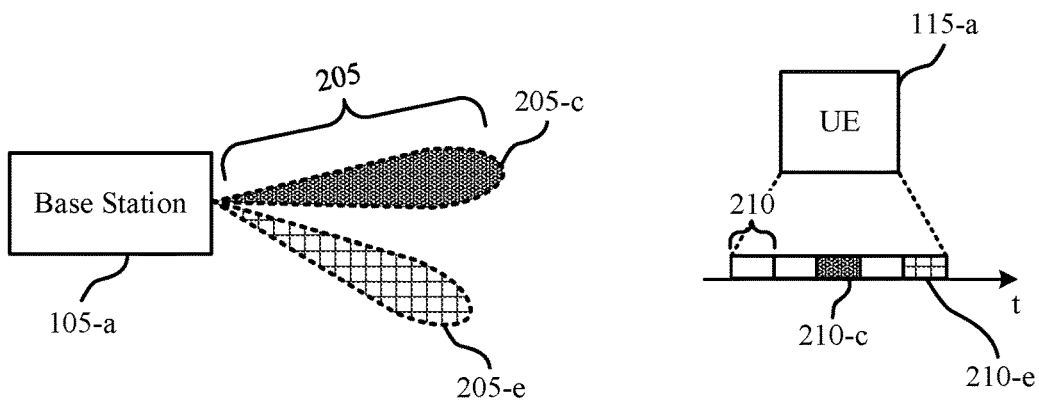

FIGS. 3A through 3C illustrate an example of a wireless communications system 300-a, 300-b, and 300-c that supports beam management for beam-swept wakeup signals in accordance with various aspects of the present disclosure. In some examples, wireless communications system 300-a through 300-c may implement aspects of techniques performed by one or more base stations 105 and one or more UEs 115. Base station 105-a may be an example of a base station 105, 105-a described with reference to FIGS. 1 to 2C, and may perform receive beam refinement, as well as beam-swept DL reference signal and wakeup signal transmission. UE 115-a may be an example of UE 115-a as described with reference to FIGS. 1 to 2C, and may perform receive beam refinement and transmit UL beam recovery signaling. UE 115-a may implement a DRX configuration in accordance with a RRC connection establishment, and perform scheduled DRX-On cycle durations for monitoring PDCCH subframes over system resources.

As illustrated in FIG. 3A, base station 105-a may implement procedures to convey one or more reference signal indications and wakeup signal transmission to a UE 115-a. Base station 105-a may transmit the one or more reference signals to the UE as at least a preemptive indication for a subsequent wakeup signal transmission over configured coarse transmit beams. In such cases, base station 105-a may transmit the reference signals via a plurality of transmit beams 205 (e.g., including BRSs contained within one or more beam sweep transmissions). Each transmit beam 205 may correspond to a TTI 210. For example, first transmit beam 205-a may correspond to first TTI 210-a, second transmit beam 205-b may correspond to second TTI 210-b, and so on. The reference signals may provide at least a reference point for downlink power over channel resources. Additionally, the reference signals may be specific to UE 115-a or specific to geographic coverage area 110-a camped on by UE 115-a.

In some cases, each of the reference signals may contain one or more SS bursts (or SS blocks), TRS bursts, PC-RS bursts, or CSI-RS bursts, or both. Each of the bursts may have a configurable periodicity (e.g., 5, 10, 20, 40, 80, 160 ms). The SS bursts may be independent of the channel bandwidth and contain one or more PSS symbols, SSS symbols, and PBCH symbols. For example, a single SS burst may contain one PSS symbol, one SSS symbol, and two PBCH symbols containing demodulation reference signal (DMRS) sequences.

In other cases, each of the reference signals may contain one or more SS bursts with a subsequent beam-swept paging transmission distinct from CSI-RS transmission and QCLed with the antenna resources of the one or more SS bursts. A quasi co-location relationship between one or more beam transmissions may refer to a spatial relationship between the antenna ports (and the corresponding signaling beams) of the respective transmissions. For example, one or more antenna ports may be implemented by base station 105-a for transmitting at least one or more reference signals and command information transmissions (e.g., C-RNTI) to UE 115-a. However, the channel properties of the signals sent via the different antenna ports may be interpreted to be the same (e.g., despite the signals being transmitted from different antenna ports), and the antenna ports (and the respective beams) may be determined to be QCLed. In such cases, UE 115-a may have respective antenna ports to emit receive beams used for receiving the QCLed transmissions (e.g., reference signal, C-RNTI). The SS bursts may contain one or more PSS, SSS, and PBCH symbols, and the PBCH symbol may contain DMRS sequences. Base station 105-a may configure the paging transmission such that the transmission is multiplexed with one or more SS bursts or schedule the paging transmission as subsequent indication following a SS burst transmission.

UE 115-a may receive the reference signal transmission over a set of TTI duration(s) (e.g., symbol, slot) 210. Each TTI 210 may correspond to a transmit beam of the received reference signal transmission. In some cases, UE 115-a may be pre-configured to individually monitor one or more coarse transmit beams of the DL transmission sequentially, for PDCCH decoding and data reception. UE 115-a may sequentially evaluate and decode the transmission within TTIs 210 associated with each pre-configured coarse transmit beam 205, and evaluate the signal quality of each pre-configured beam, in a hierarchical manner. For example, UE 115-a may evaluate the initial pre-configured transmit beam (e.g., primary transmit beam) and determine the link quality of the primary beam is degraded below a pre-configured threshold. UE 115-a may then sequentially evaluate the quality of each subsequent pre-configured transmit beams (e.g., secondary transmit beams) and individually determine the link quality of each secondary beam is degraded below the pre-configured threshold as well. UE 115-a may locate one or more alternative transmit beams 205 of the transmit beam sweep, and determine the one or more non-configured beams 205 are of sufficient quality for message reception.

As illustrated in FIG. 3B, UE 115-a may transmit an UL beam recovery signal transmission to base station 105-a via one or more selected transmit beams 305. Base station 105-a may train one or more receive beams 215 for UL beam recovery signal reception. The receive beams 215 may be emitted in a beam-swept manner. Base station 105-a may receive the UL transmission containing transmit beams 305 over the associated receive beams 215. Base station 105-a may decode and interpret the UL transmission during the corresponding TTIs 220 of the associated receive beams 215. Based at least in part on implemented receive beams 215, base station 105-a may identify the transmit beams selected by UE 115-a for wakeup signal transmission.

As illustrated in FIG. 3C, base station 105-a may transmit the wakeup signal to UE 115-a via the UE selected coarse transmit beams 205. Transmit beams 205 may directly correspond to the implemented receive beams 215. UE 115-a may receive the selected coarse beams 205 and decode and interpret the wakeup signal transmission within the corresponding TTI 210 associated with the preferred transmit beam 205. For example, UE 115-a may decode and interpret the wakeup signal transmission during third TTI 210-c and fifth TTI 210-e based on identifying third transmit beam 205-c and fifth transmit beam 205-e as preferred transmit beams. UE 115-a may interpret the reception as a wakeup signal indication and initiate a DRX-On configuration for subsequent PDCCH and DL data transmission.

FIGS. 4A through 4D illustrate an example of a wireless communications system 400-a, 400-b, 400-c, and 400-d that supports beam management for beam-swept wakeup signals in accordance with various aspects of the present disclosure. In some examples, wireless communications system 400-a, 400-b, 400-c, and 400-d may implement aspects of techniques performed by one or more base stations 105 and one or more UEs 115, as described with reference to FIGS. 2A to 3C. Wireless communications system 400-a through 400-d illustrate techniques for hierarchical beam management procedure following DL wakeup signal transmission.

Figure 4A:
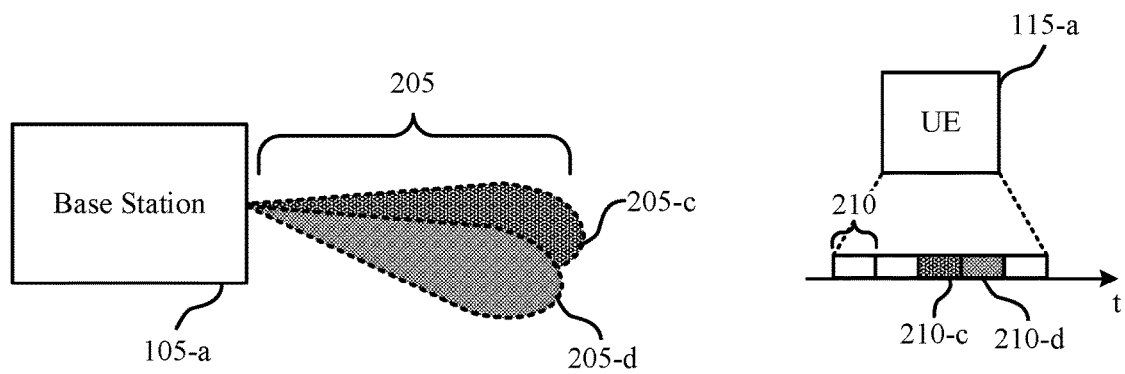
FIGS. 4A through 4D illustrates an example of a wireless communications system that supports beam management for beam-swept wakeup signals in accordance with aspects of the present disclosure.

As illustrated in FIG. 4A, base station 105-a may transmit a DL wakeup signal to UE 115-a via one or more selected coarse transmit beams 205. The coarse transmit beams 205 may consist of one or more transmit beams pre-configured at UE 115-a, or one or more selected transmit beams according to the preemptive reference signal reception and beam recovery signal transmission at UE 115-a. Each transmit beam 205 may correspond to a TTI 210. For example, third transmit beam 205-c may correspond to third TTI 210-c, and fourth transmit beam 205-e may correspond to fourth TTI 210-d. The wakeup signal may contain full or part of the configuration for beam management, including an indication regarding the transmission of a refined beam management procedure. In the case that a full beam management configuration is transmitted with the wakeup signal, UE 115-a may provide an indication to base station 105-a to forgo beam refinement procedure and initiate PDCCH transmission. Alternatively, base station 105-a may provide a portion of the wakeup signal transmission, with a subsequent reference signal indication over a set of refined transmit beams. In some cases, UE 115-a may receive the wakeup signal transmission and evaluate and decode the primary transmit beam 205 during the associated TTI 210 of the beam. In the case that the primary transmit beam has been degraded, UE 115-a may subsequently evaluate and decode a secondary transmit beam 205 during the associated TTI 210 of the beam. Based at least in part on the evaluation of the wakeup signal, UE 115-a may initiate a DRX-On cycle.

Figure 4B:
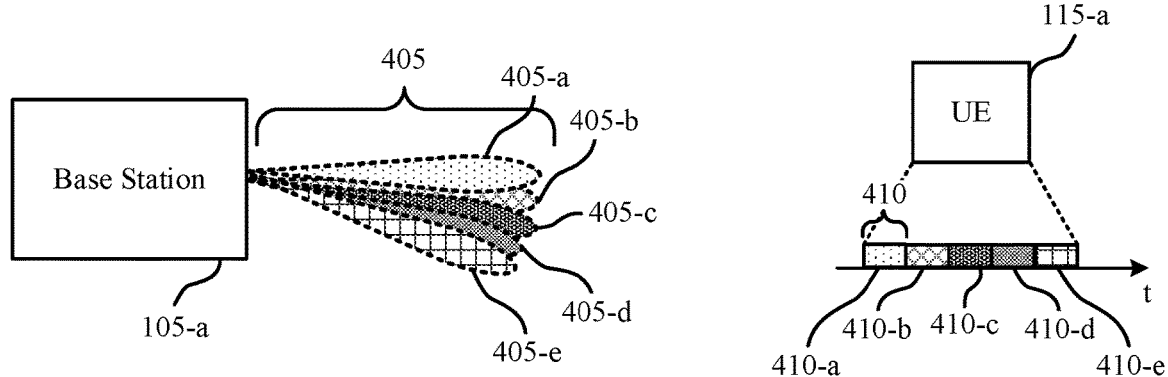

As illustrated in FIG. 4B, base station 105-a may perform refined beam management procedure within the DRX-On cycle duration. Base station 105-a may transmit a refined reference signal beam sweep to UE 115-a. The refined beam sweep may consist of one or more refined transmit beams 405 spanning the frequency resources of the coarse transmit beams 205. The number of refined transmit beams 405 may exceed the number of coarse beams for wakeup signal transmission and may not share a common beam with the coarse transmit beams. In some cases, the refined transmit beams 405 may contain one or more SS bursts or CSI-RS burst indications. In other cases, the refined transmit beams 405 may contain one or more SS bursts with a subsequent beam-swept paging transmission distinct from CSI-RS transmission and QCLed with the antenna resources of the one or more SS bursts. UE 115-a may receive the beam-swept reference signal transmission over the one or more refined transmit beams 405, and evaluate and interpret the transmission within the associated refined TTIs 410 associated with the transmit beams. Each refined transmit beam 405 may correspond to a refined TTI 410. For example, first refined transmit beam 405-*a* may correspond to first refined TTI 410-*a*, second refined transmit beam 405-*b* may correspond to second refined TTI 410-*b*, and so on. In some cases, a duration of a refined TTI 410 is shorter than a duration of a TTI 210.

Figure 4C:
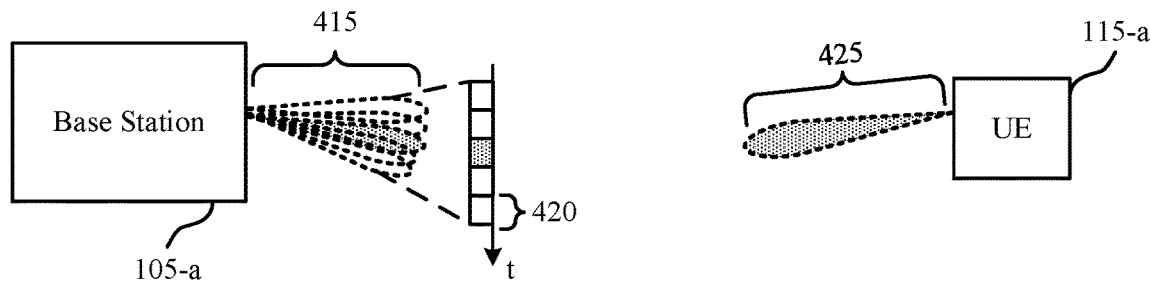

As illustrated in FIG. 4C, UE 115-*a* may transmit an UL beam recovery signal to the base station over one of the identified transmit beams of the refined reference signal transmission. Base station 105-*a* may train one or more refined receive beams 415 for UL beam recovery signal reception. The receive beams 415 may be emitted in a beam-swept manner. Base station 105-*a* may receive the UL transmission containing the transmit beam 425 over an associated receive beam 415. Base station 105-*a* may decode and interpret the UL transmission within the TTI 420 associated with the receive beam 415. Based at least in part on the implemented receive beam 415, base station 105-*a* may identify the beam response signal indicated in the transmit beam 425.

Figure 4D:
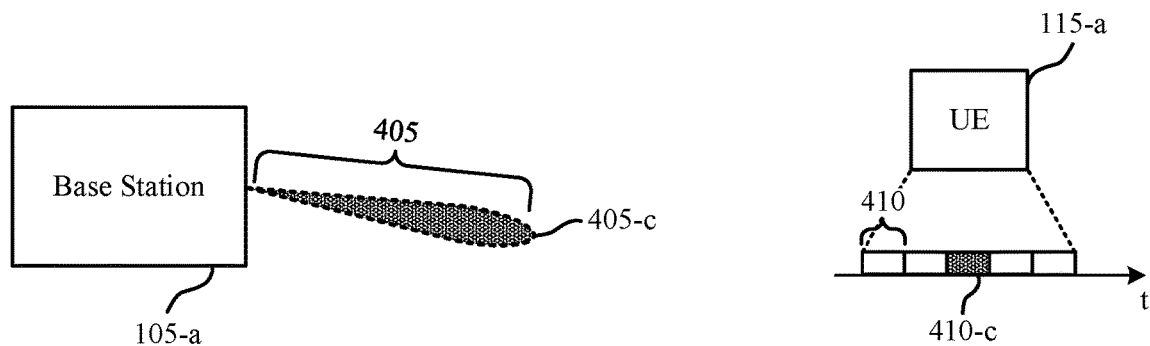

As illustrated in FIG. 4D, base station 105-*a* may transmit DL data including a full PDCCH and DL traffic payload to UE 115-*a* over the UE selected refined transmit beam 405. UE 115-*a* may receive the refined transmit beam 405 within the refined TTI 410 corresponding to the transmit beam. For example, base station 105-*a* may transmit DL data over third refined transmit beam 405-*c* and UE 115-*a* may receive the DL data during third refined TTI 410-*c*. UE 115-*a* may then interpret the command information and DL data synchronously to the initiated DRX-On cycle duration.

Figure 5:
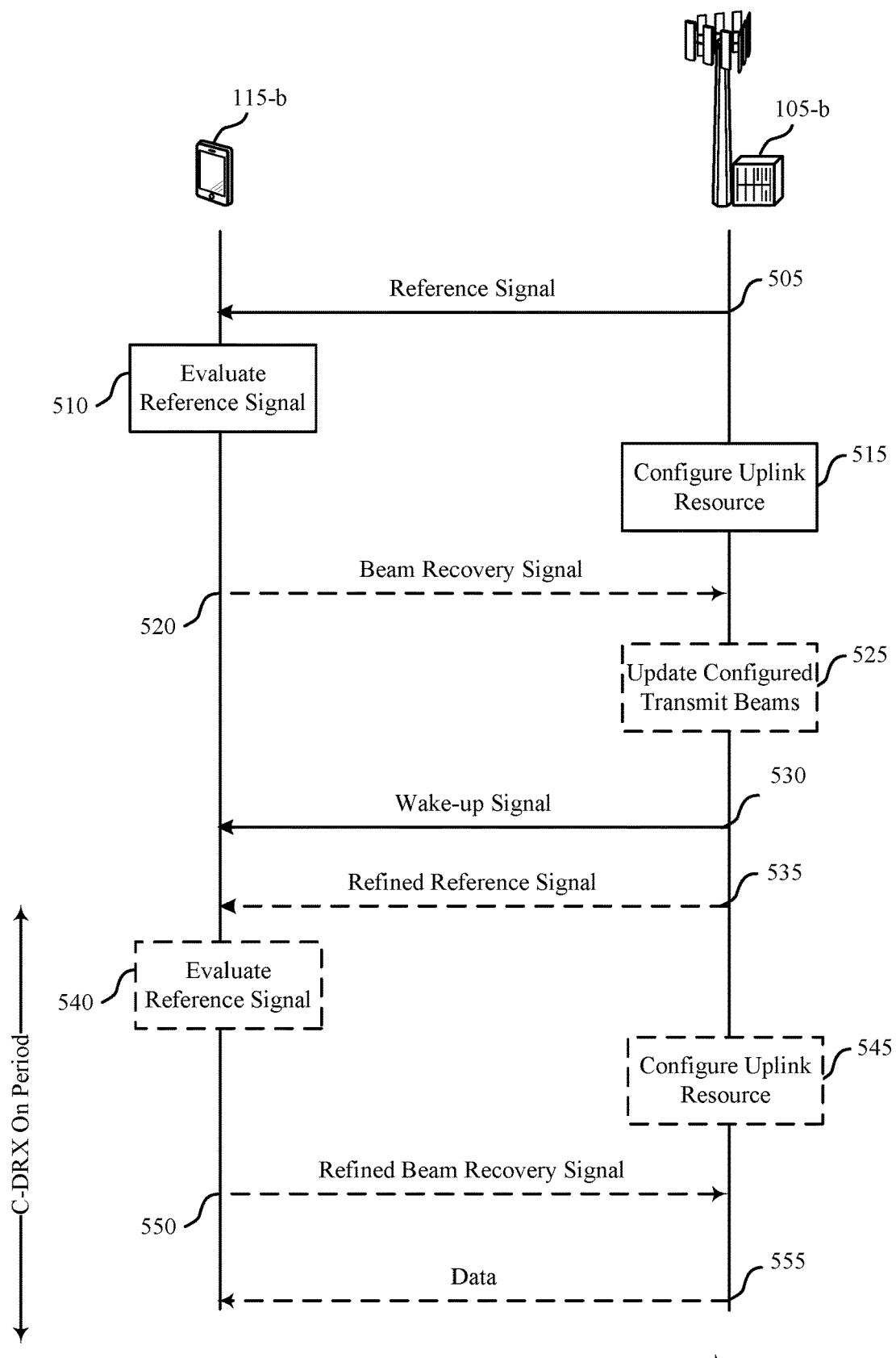
FIG. 5 illustrates a process flow in a system that supports beam management in accordance with aspects of the present disclosure.

FIG. 5 illustrates an example of a process flow 500 that supports beam management in accordance with aspects of the present disclosure. In some cases, process flow 500 may represent aspects of techniques performed by one or more base stations 105 for DL transmission, receive beam training, and UL reception, and one or more UEs 115 for DL reception, transmit beam selection, and beam recovery signal transmission. Process flow 500 illustrates techniques for coarse beam management for beam-swept wakeup signals, and refined beam management for PDCCH transmission.

At 505, base station 105-*b* may provide a beam-swept transmission of one or more reference signals to UE 115-*b*. Base station 105-*b* may transmit the reference signals via BRSs of one or more beam-swept transmissions. The beam-swept transmissions may function as at least a reference point for downlink power over channel resources and a preemptive indication for subsequent wakeup signal transmission.

At 510, UE 115-*b* may sequentially evaluate the reference signal over one or more pre-configured transmit beams, in a hierarchical manner. In some cases, UE 115-*b* may evaluate an initial pre-configured transmit beam (e.g., primary transmit beam) and determine the signal quality of the beam is sufficient. Based at least in part on the transmit beam sufficiency, UE 115-*b* may opt to forgo additional transmit beam evaluation and suspend beam recovery signal transmission to the base station. In other cases, UE 115-*b* may evaluate the initial pre-configured transmit beam (e.g., primary transmit beam) and determine the link quality of the primary beam is degraded below a pre-configured threshold. UE 115-*b* may then evaluate a subsequent pre-configured transmit beam (e.g., secondary transmit beam) and determine the signal quality of the secondary beam. In the case the secondary transmit beam is sufficient, UE 115-*b* may opt to forgo additional transmit beam evaluation and suspend beam recovery signal transmission. In the case that each pre-configured beam is degraded, UE 115-*b* may evaluate alternate beams of reference signal transmission 505.

At 515, base station 105-*b* may train one or more receive beams for UL beam recovery signal reception. The receive beams may be emitted in a beam-swept manner, each receive beam may be associated with a TTI period. In the case of absence of a beam recovery signal reception, base station 105-*b* may maintain the pre-configured transmit beams of UE 115-*b* for wakeup signal transmission. Alternatively, base station 105-*b* may receive the UL beam recovery signal transmission 520 via one or more transmit beams. At 525, base station 105-*b* may decode and interpret the UL transmission during the corresponding TTIs of the associated receive beams. Based at least in part on implemented receive beams, base station 105-*b* may identify the transmit beams selected by UE 115-*b* for wakeup signal transmission.

At 530, base station 105-*b* may transmit a wakeup signal to UE 115-*b* via the UE selected coarse transmit beams. The transmit beams may directly correspond to the implemented receive beams of base station 105-*b*. UE 115-*b* may receive the selected coarse beams and decode and interpret the wakeup signal transmission within the corresponding TTI associated with the preferred transmit beam of UE 115-*b*. UE 115-*b* then may interpret the reception as a wakeup signal indication, and initiate a DRX-On configuration for subsequent PDCCH and DL data transmission.

At 535, base station 105-*b* may transmit a refined reference signal transmission to UE 115-*b* for a refined beam management procedure. Base station 105-*b* may transmit the reference signals via refined BRSs of higher granularity and greater number than the coarse transmit beams of the wakeup signal transmission. The beam-swept transmissions may function as at least a reference point for downlink power over channel resources and a preemptive indication for subsequent PDCCH and DL data transmission.

At 540, UE 115-*b* may evaluate the refined reference signal transmission and determine a preferred transmit beam of the transmission. At 545, base station 105-*b* may train one or more refined receive beams for UL beam recovery signal reception. The receive beams may be emitted in a beam-swept manner, each receive beam may be associated with a TTI period.

UE 115-*b* may transmit a refined beam recovery signal 550 to base station 105-*b* indicating the selected transmit beam of the set of refined transmit beams for PDCCH reception. Base station 105-*b* may evaluate the indication and identify the selected transmit beam of UE 115-*b*. Base station 105-*b* may then transmit data 555, including a full PDCCH and DL traffic payload to UE 115-*b* over the UE selected transmit beam.

Figure 6:
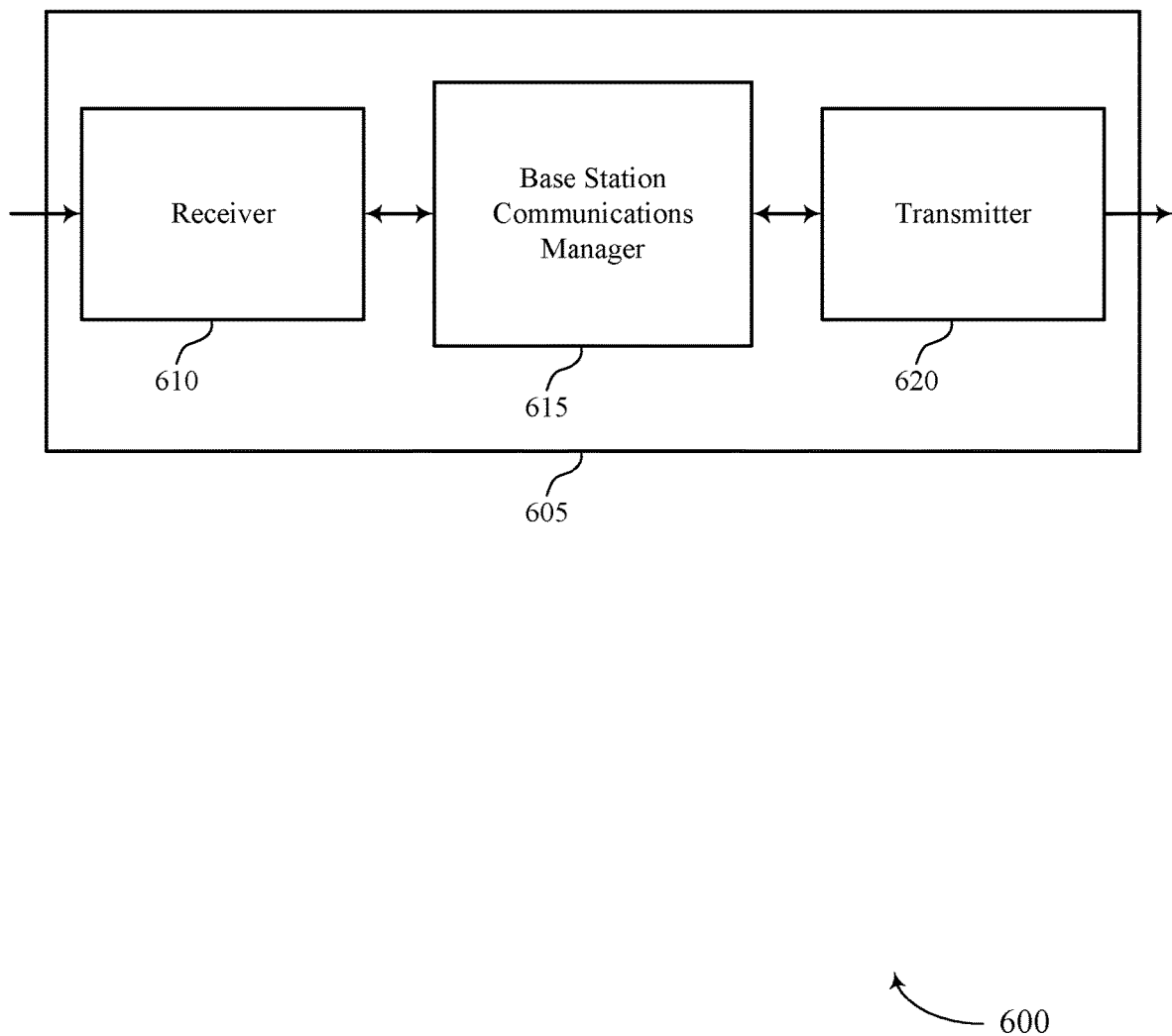
FIGS. 6 through 8 show block diagrams of a device that supports beam management in accordance with aspects of the present disclosure.

FIG. 6 shows a block diagram 600 of a wireless device 605 that supports beam management in accordance with aspects of the present disclosure. Wireless device 605 may be an example of aspects of a base station 105 as described herein. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to beam management for beam-swept wakeup signals, etc.). Information may be passed on to other components of the device. The receiver 610 may be an example of aspects of the transceiver 935 described with reference to FIG. 9. The receiver 610 may utilize a single antenna or a set of antennas.

Base station communications manager 615 may be an example of aspects of the base station communications manager 915 described with reference to FIG. 9. Base station communications manager 615 and/or at least some of its various sub-components may be implemented in hardware, software executed by a processor, firmware, or any combination thereof. If implemented in software executed by a processor, the functions of the base station communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station communications manager 615 and/or at least some of its various sub-components may be physically located at various positions, including being distributed such that portions of functions are implemented at different physical locations by one or more physical devices. In some examples, base station communications manager 615 and/or at least some of its various sub-components may be a separate and distinct component in accordance with various aspects of the present disclosure. In other examples, base station communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 615 may identify that data is available to be transmitted to a UE 115 that is operating in a DRX mode and transmit, to the UE 115, a wakeup signal to wake the UE from a sleep state of the DRX mode, the wakeup signal transmitted using a first transmit beam and a second transmit beam of a first set of transmit beams in accordance with a beam sweeping configuration.

In some examples, base station communications manager 615 may also transmit, to a UE that is operating in a DRX mode, a wakeup signal to wake the UE 115 from a sleep state of the DRX mode, the wakeup signal transmitted using a first transmit beam and a second transmit beam of a first set of transmit beams in accordance with a beam sweeping configuration. In some cases, base station communications manager 615 may transmit a set of signals using a second set of transmit beams, the set of signals including reference signals, or synchronization signals, or a combination thereof, and receive an indication of a transmit beam from the second set of transmit beams, the transmit beam selected by the UE.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
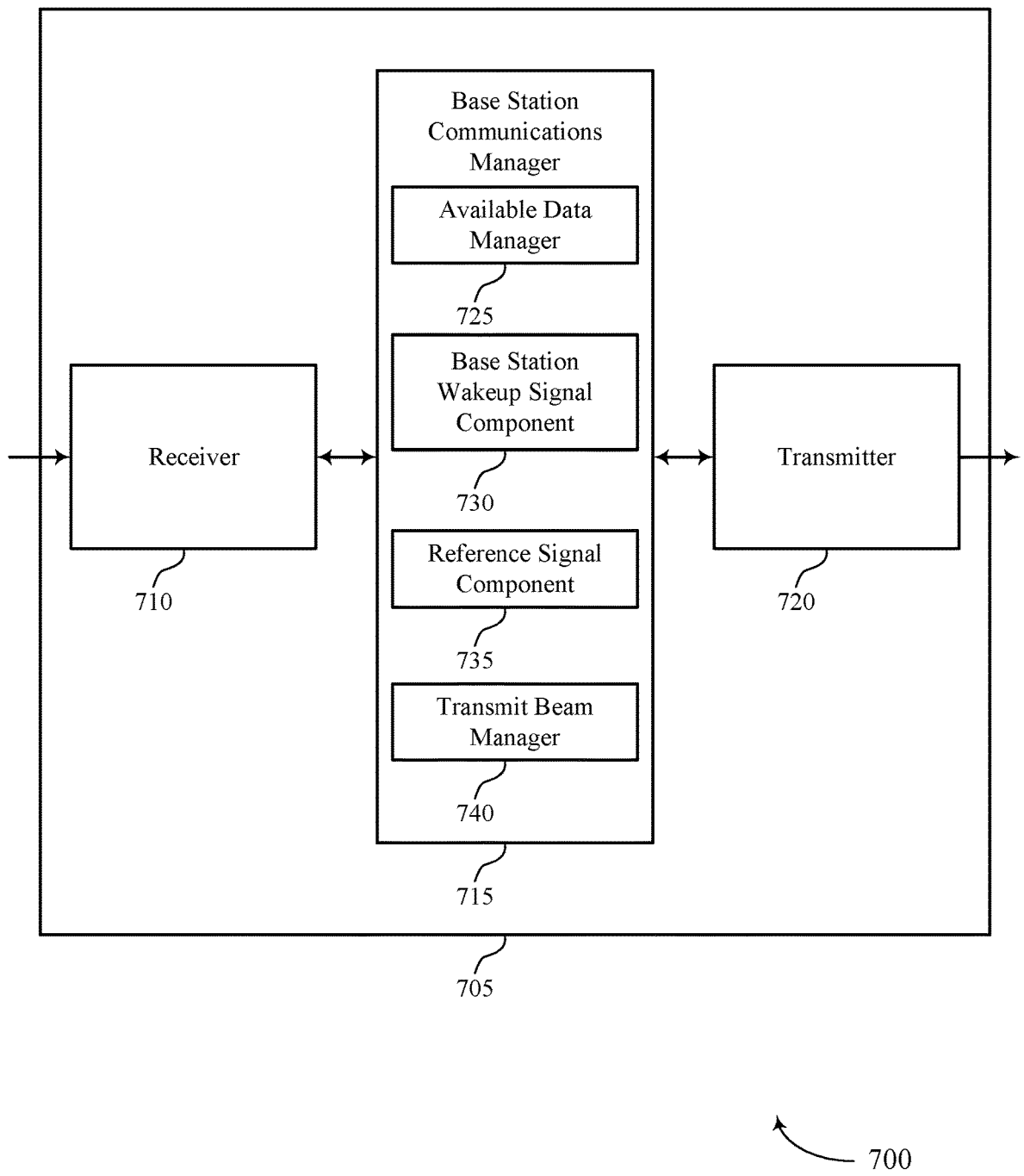

FIG. 7 shows a block diagram 700 of a wireless device 705 that supports beam management in accordance with aspects of the present disclosure. Wireless device 705 may be an example of aspects of a wireless device 605 or a base station 105 as described with reference to FIG. 6. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to beam management for beam-swept wakeup signals, etc.). Information may be passed on to other components of the device. The receiver 710 may be an example of aspects of the transceiver 935 described with reference to FIG. 9. The receiver 710 may utilize a single antenna or a set of antennas.

Base station communications manager 715 may be an example of aspects of the base station communications manager 915 described with reference to FIG. 9. Base station communications manager 715 may also include available data manager 725, base station wakeup signal component 730, signaling component 735, and transmit beam manager 740.

Available data manager 725 may identify that data is available to be transmitted to a UE that is operating in a DRX mode. Base station wakeup signal component 730 may transmit, to the UE 115, a wakeup signal to wake the UE 115 from a sleep state of the DRX mode, the wakeup signal transmitted using a first transmit beam and a second transmit beam of a first set of transmit beams in accordance with a beam sweeping configuration. In some cases, the first transmit beam, or the second transmit beam, or both, are a pseudo-omni beam. In some cases, the wakeup signal includes a narrowband tone, or a UE-specific reference signal, or a PDCCH including a plurality of cyclic redundancy check (CRC) bits scrambled by a C-RNTI of the UE, or a combination thereof. In some cases, the DRX mode includes a connected C-DRX mode.

Signaling component 735 may transmit a set of signals using a second set of transmit beams, the set of signals including reference signals, or synchronization signals, or a combination thereof and transmit the set of signals using the second set of transmit beams based on the received indication of the second set of transmit beams. In some cases, the reference signals include DMRSs, TRSs, PC-RSs, or CSI-RSs, or a combination thereof. In some cases, the synchronization signals include PSSs, SSSs, DMRSs, PBCH signals, or a combination thereof.

Transmit beam manager 740 may configure the UE 115 to transmit the indication of the second set of transmit beams at a predetermined periodicity, transmit the set of signals using the first set of transmit beams in accordance with the beam sweeping configuration, and identify at least the first transmit beam and the second transmit beam of the first set of transmit beams based on the identified set of transmit beams used to transmit the set of synchronization signals. In some cases, transmit beam manager 740 may receive an indication of a transmit beam from the second set of transmit beams, the transmit beam selected by the UE 115. In some examples, transmit beam manager 740 may receive an indication of the second set of transmit beams from the UE 115, transmit, using the indicated transmit beam, a PDCCH, or a resource grant, or downlink data, or a combination thereof, and identify a set of transmit beams used to transmit a set of synchronization signals.

In some cases, receiving, from the UE 115, an indication of a second set of transmit beams including a set of transmit beams selected by the UE 115 based on the set of signals, where transmitting the wakeup signal includes: transmitting the wakeup signal using a set of transmit beams of the second set of transmit beams based on the received indication. In some cases, a number of the second transmit beams is greater than a number of the first set of transmit beams. In some cases, receiving the indication of the second set of transmit beams includes: receiving a beam recovery signal that identifies the second set of transmit beams. In some cases, each of the second set of transmit beams is different from each of the first set of transmit beams.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
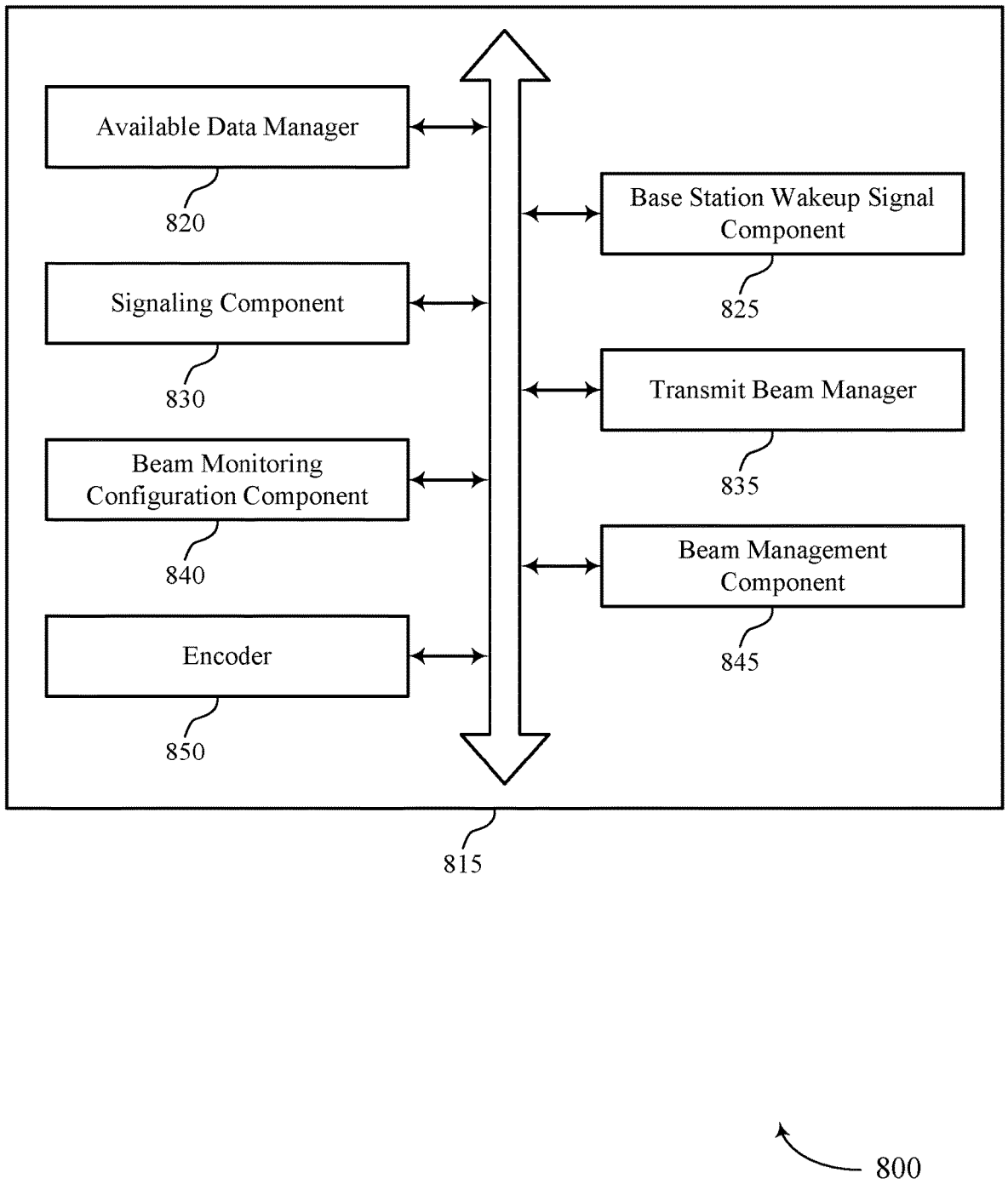

FIG. 8 shows a block diagram 800 of a base station communications manager 815 that supports beam management in accordance with aspects of the present disclosure. The base station communications manager 815 may be an example of aspects of a base station communications manager 615, a base station communications manager 715, or a base station communications manager 915 described with reference to FIGS. 6, 7, and 9. The base station communications manager 815 may include available data manager 820, base station wakeup signal component 825, signaling component 830, transmit beam manager 835, beam monitoring configuration component 840, beam management component 845, and encoder 850. Each of these modules may communicate, directly or indirectly, with one another (e.g., via one or more buses).

Available data manager 820 may identify that data is available to be transmitted to a UE that is operating in a DRX mode.

Base station wakeup signal component 825 may transmit, to the UE 115, a wakeup signal to wake the UE 115 from a sleep state of the DRX mode, the wakeup signal transmitted using a first transmit beam and a second transmit beam of a first set of transmit beams in accordance with a beam sweeping configuration. In some cases, the first transmit beam, or the second transmit beam, or both, are a pseudo-omni beam. In some cases, the wakeup signal includes a narrowband tone, or a UE-specific reference signal, or a PDCCH including a plurality of cyclic redundancy check (CRC) bits scrambled by a C-RNTI of the UE, or a combination thereof. In some cases, the DRX mode includes a connected C-DRX mode.

Signaling component 830 may transmit a set of signals using a second set of transmit beams, the set of signals including reference signals, or synchronization signals, or a combination thereof and transmit the set of signals using the second set of transmit beams based on the received indication of the second set of transmit beams. In some cases, the reference signals include DMRSs, TRSs, PC-RSs, or CSI-RSs, or a combination thereof. In some cases, the synchronization signals include PSSs, SSSs, DMRSs, PBCH signals, or a combination thereof.

Transmit beam manager 835 may configure the UE 115 to transmit the indication of the second set of transmit beams at a predetermined periodicity, transmit the set of signals using the first set of transmit beams in accordance with the beam sweeping configuration, and identify at least the first transmit beam and the second transmit beam of the first set of transmit beams based on the identified set of transmit beams used to transmit the set of synchronization signals. In some cases, transmit beam manager 740 may receive an indication of a transmit beam from the second set of transmit beams, the transmit beam selected by the UE 115. In some examples, transmit beam manager 740 may receive an indication of the second set of transmit beams from the UE 115, transmit, using the indicated transmit beam, a PDCCH, or a resource grant, or downlink data, or a combination thereof, and identify a set of transmit beams used to transmit a set of synchronization signals.

In some cases, receiving, from the UE 115, an indication of a second set of transmit beams including a set of transmit beams selected by the UE 115 based on the set of signals, where transmitting the wakeup signal includes: transmitting the wakeup signal using a set of transmit beams of the second set of transmit beams based on the received indication. In some cases, a number of the second transmit beams is greater than a number of the first set of transmit beams. In some cases, receiving the indication of the second set of transmit beams includes: receiving a beam recovery signal that identifies the second set of transmit beams. In some cases, each of the second set of transmit beams is different from each of the first set of transmit beams.

Beam monitoring configuration component 840 may configure the UE to monitor the first set of transmit beams to receive a set of signals from the base station while operating in the DRX mode, the set of signals including reference signals, or synchronization signals, or a combination thereof. In some cases, beam monitoring configuration component 840 may determine a link quality threshold to decode the wakeup signal and configure the UE 115 to transmit the indication of the second set of transmit beams when a link quality of the first transmit beam or the second transmit beam of the first set of transmit beams fails to satisfy the determined link quality threshold.

Beam management component 845 may determine a beam management configuration for the UE to use to receive the second set of transmit beams and transmit at least a part of the beam management configuration with the wakeup signal. Encoder 850 may encode the set of signals using a code rate that is higher than a code rate used to encode the wakeup signal.

Figure 9:
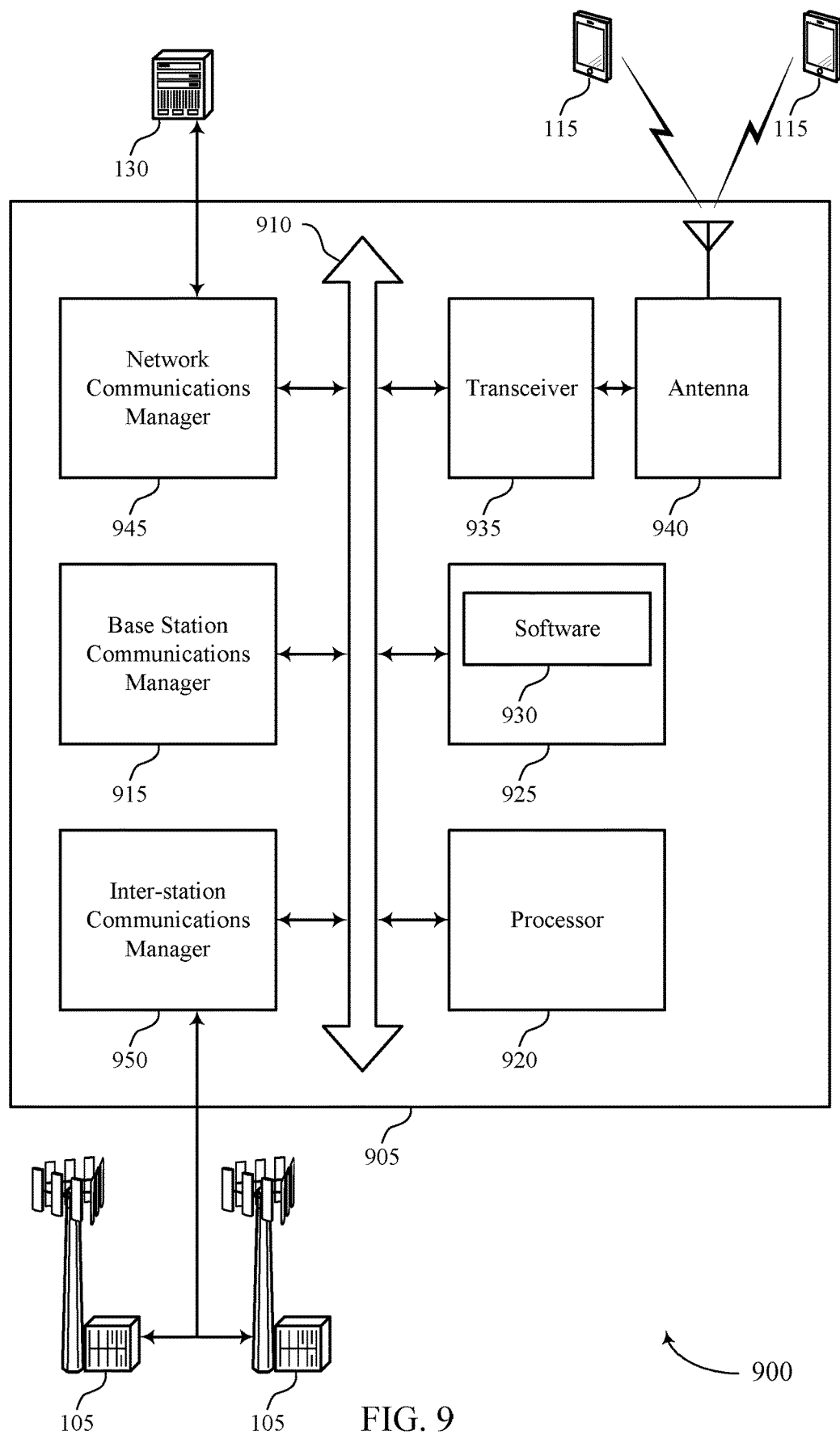
FIG. 9 illustrates a block diagram of a system including a base station that supports beam management in accordance with aspects of the present disclosure.

FIG. 9 shows a diagram of a system 900 including a device 905 that supports beam management in accordance with aspects of the present disclosure. Device 905 may be an example of or include the components of wireless device 605, wireless device 705, or a base station 105 as described above, e.g., with reference to FIGS. 6 and 7. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting beam management for beam-swept wakeup signals).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support beam management for beam-swept wakeup signals. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas. In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an Long Term Evolution (LTE)/LTE-A wireless communication network technology to provide communication between base stations 105.

Figure 10:
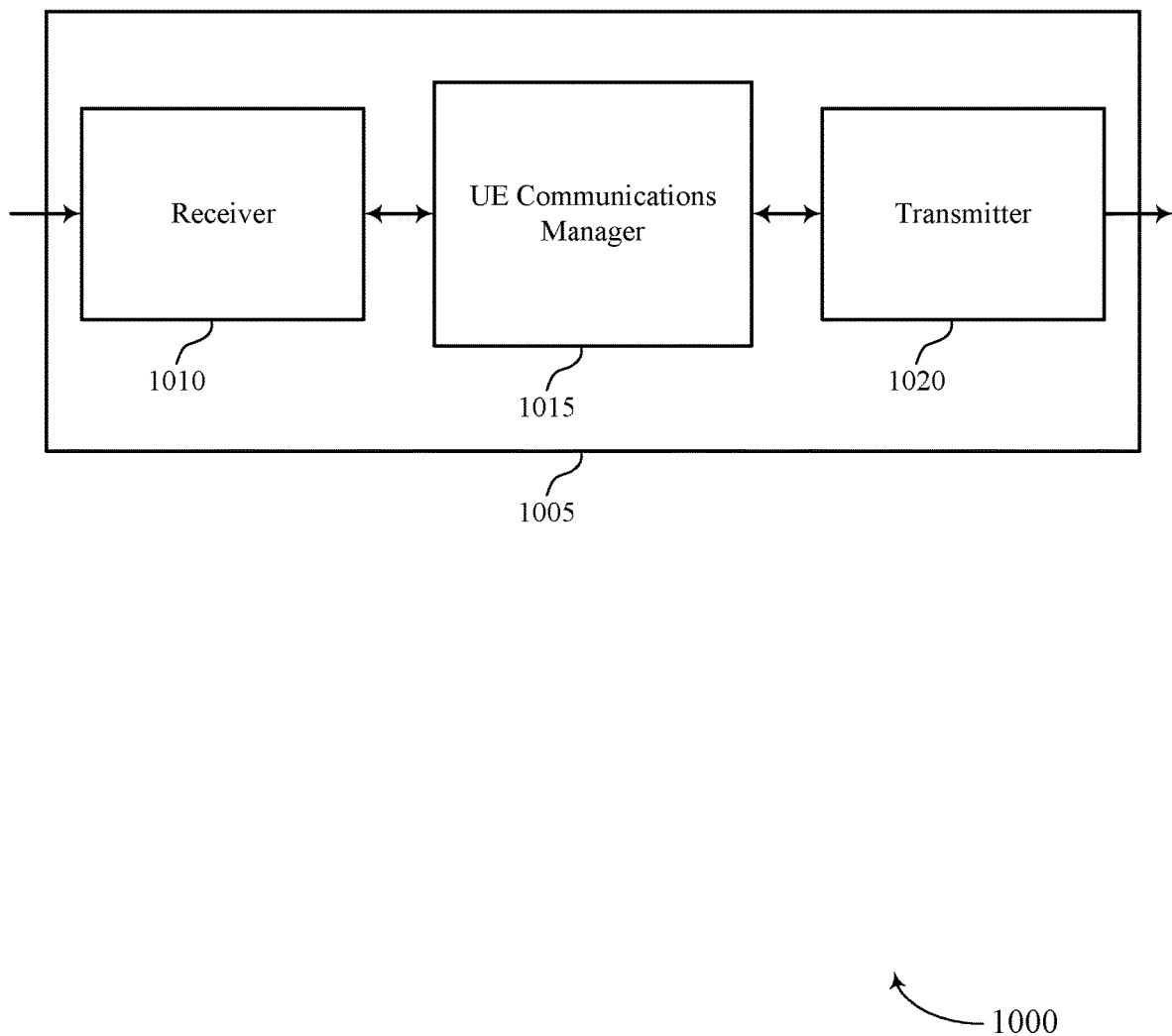
FIGS. 10 through 12 show block diagrams of a device that supports beam management in accordance with aspects of the present disclosure.

FIG. 10 shows a block diagram 1000 of a wireless device 1005 that supports beam management in accordance with aspects of the present disclosure. Wireless device 1005 may be an example of aspects of a UE 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to beam management for beam-swept wakeup signals, etc.). Information may be passed on to other components of the device. The receiver 1010 may be an example of aspects of the transceiver 1335 described with reference to FIG. 13. The receiver 1010 may utilize a single antenna or a set of antennas.

UE communications manager 1015 may be an example of aspects of the UE communications manager 1315 described with reference to FIG. 13. UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may receive, while operating in a DRX mode, a first signal of a set of signals using a first transmit beam of a first set of transmit beams and a second signal of the set of signals using a second transmit beam of the first set of transmit beams, the set of signals including reference signals, or synchronization signals, or a combination thereof, and transmitted by a base station using a beam sweeping configuration. In some examples, UE communications manager 1015 may select a second set of transmit beams based on the received set of signals, the second set of transmit beams including two or more transmit beams, and the two or more transmit beams being different from the first set of transmit beams. UE communications manager 1015 may transmit an indication of the selected second set of transmit beams to the base station.

In some examples, UE communications manager 1015 may also receive, while operating in a DRX mode, a wakeup signal to wake the UE from a sleep state of the DRX mode, the wakeup signal transmitted by a base station using a first transmit beam and a second transmit beam of a first set of transmit beams in accordance with a beam sweeping configuration. In some cases, UE communications manager 1015 may receive, based on receiving the wakeup signal, a set of signals transmitted by the base station using a second set of transmit beams, the set of signals including reference signals, or synchronization signals, or a combination thereof, select a transmit beam from the second set of transmit beams for the UE to use to receive downlink transmissions from the base station, and transmit an indication of the selected transmit beam to the base station.

In some examples, UE communications manager 1015 may also receive, from a base station, a first set of signals in a first set of transmit beams and a second set of signals in a second set of transmit beams, wherein the first set of signals comprise reference signals, or synchronization signals, or a combination thereof. The UE communications manager 1015 may also select a transmit beam from the second set of transmit beams based at least in part on the received first set of signals. In other examples, the UE communications manager 1015 may also transmit an indication of the selected transmit beam from the second set of transmit beams to the base station.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
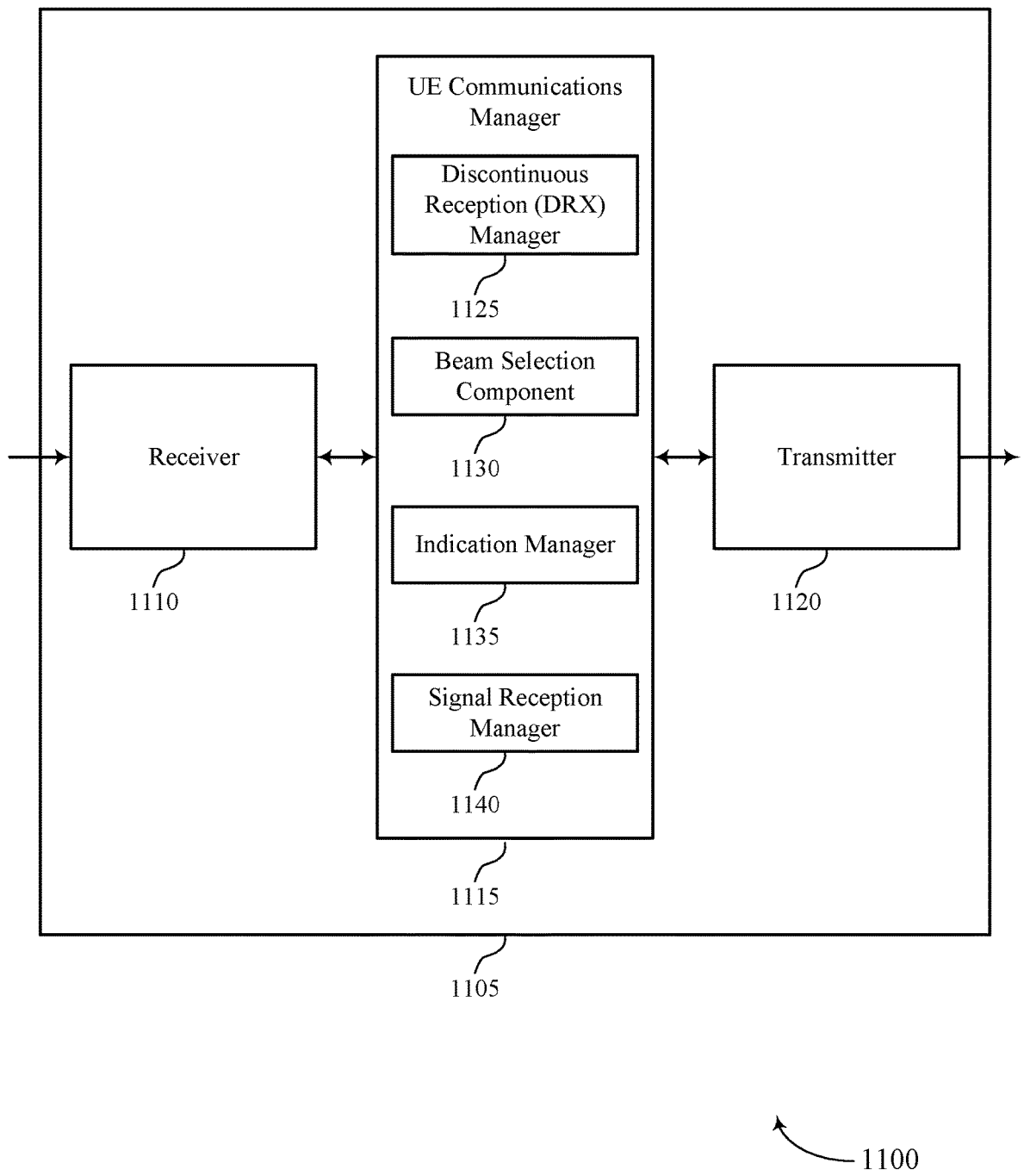

FIG. 11 shows a block diagram 1100 of a wireless device 1105 that supports beam management in accordance with aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to beam management for beam-swept wakeup signals, etc.). Information may be passed on to other components of the device. The receiver 1110 may be an example of aspects of the transceiver 1335 described with reference to FIG. 13. The receiver 1110 may utilize a single antenna or a set of antennas.

UE communications manager 1115 may be an example of aspects of the UE communications manager 1315 described with reference to FIG. 13. UE communications manager 1115 may also include DRX manager 1125, beam selection component 1130, indication manager 1135, and signal reception component 1140.

DRX manager 1125 may receive, while operating in a DRX mode, a first signal of a set of signals using a first transmit beam of a first set of transmit beams and a second signal of the set of signals using a second transmit beam of the first set of transmit beams, the set of signals including reference signals, or synchronization signals, or a combination thereof, and transmitted by a base station using a beam sweeping configuration. DRX manager 1125 may wake up from a sleep state of the DRX mode to receive data based on the received wakeup signal. In some examples, DRX manager 1125 may receive, while operating in a DRX mode, a wakeup signal to wake the UE from a sleep state of the DRX mode, the wakeup signal transmitted by a base station using a first transmit beam and a second transmit beam of a first set of transmit beams in accordance with a beam sweeping configuration, and receive, as part of the wakeup signal, at least a part of a beam management configuration used to select the transmit beam from the second set of transmit beams. In some cases, the reference signals include DMRSs, TRSs, PC-RSs, or CSI-RSs, or a combination thereof. In some cases, the synchronization signals include PSSs, SSSs, DMRSs, PBCH signals, or a combination thereof. In some cases, the DRX mode includes a C-DRX mode.

Beam selection component 1130 may select a second set of transmit beams based on the received set of signals, the second set of transmit beams including two or more transmit beams, and the two or more transmit beams being different from the first set of transmit beams and select a transmit beam from the second set of transmit beams for the UE 115 to use to receive downlink transmissions from the base station. Beam selection component 1130 may also select a transmit beam from the second set of transmit beams based at least in part on the received first set of signals.

Indication manager 1135 may transmit an indication of the selected second set of transmit beams to the base station 105 and transmit an indication of the selected transmit beam to the base station. In some cases, transmitting the indication of the selected second set of transmit beams includes: transmitting a beam recovery signal that identifies the selected second set of transmit beams. Indication manager 1135 may also transmit an indication of the selected transmit beam from the second set of transmit beams to the base station.

Signal reception component 1140 may receive, based on receiving the wakeup signal, a set of signals transmitted by the base station using a second set of transmit beams, the set of signals including reference signals, or synchronization signals, or a combination thereof and receive the downlink transmissions transmitted by the base station using the selected transmit beam, where the downlink transmissions include a PDCCH, or a resource grant, or downlink data, or a combination thereof. In some cases, a number of the second transmit beams is greater than a number of the first set of transmit beams. Signal reception component 1140 may also receive, from a base station, a first set of signals in a first set of transmit beams and a second set of signals in a second set of transmit beams, wherein the first set of signals comprise reference signals, or synchronization signals, or a combination thereof.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
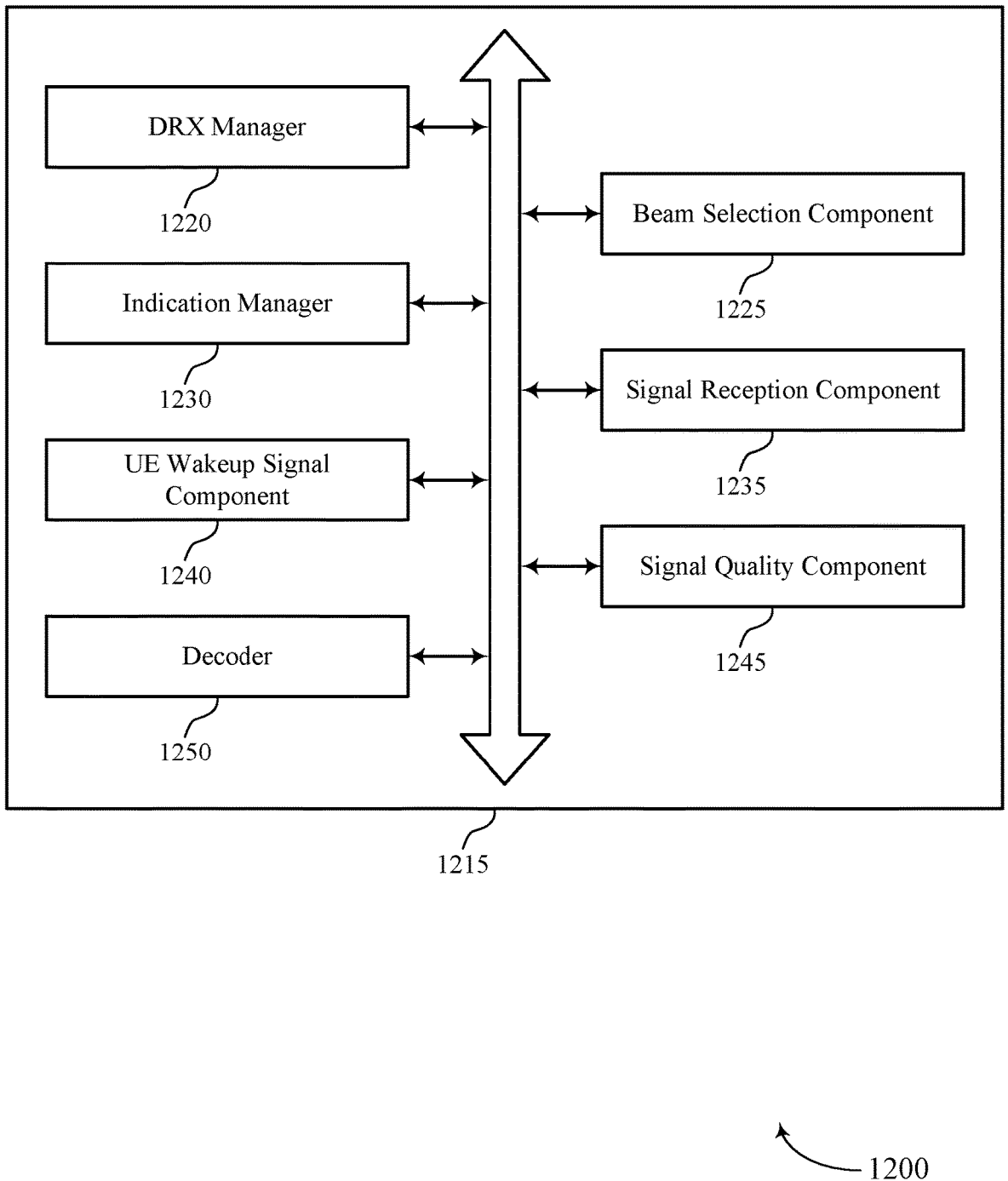

FIG. 12 shows a block diagram 1200 of a UE communications manager 1215 that supports beam management in accordance with aspects of the present disclosure. The UE communications manager 1215 may be an example of aspects of a UE communications manager 1315 described with reference to FIGS. 10, 11, and 13. The UE communications manager 1215 may include DRX manager 1220, beam selection component 1225, indication manager 1230, signal reception component 1235, UE wakeup signal component 1240, signal quality component 1245, and decoder 1250. Each of these modules may communicate, directly or indirectly, with one another (e.g., via one or more buses).

DRX manager 1220 may receive, while operating in a DRX mode, a first signal of a set of signals using a first transmit beam of a first set of transmit beams and a second signal of the set of signals using a second transmit beam of the first set of transmit beams, the set of signals including reference signals, or synchronization signals, or a combination thereof, and transmitted by a base station using a beam sweeping configuration. DRX manager 1220 may wake up from a sleep state of the DRX mode to receive data based on the received wakeup signal. In some examples, DRX manager 1220 may receive, while operating in a DRX mode, a wakeup signal to wake the UE from a sleep state of the DRX mode, the wakeup signal transmitted by a base station using a first transmit beam and a second transmit beam of a first set of transmit beams in accordance with a beam sweeping configuration, and receive, as part of the wakeup signal, at least a part of a beam management configuration used to select the transmit beam from the second set of transmit beams. In some cases, the reference signals include DMRSs, TRSs, PC-RSs, or CSI-RSs, or a combination thereof. In some cases, the synchronization signals include PSSs, SSSs, DMRSs, PBCH signals, or a combination thereof. In some cases, the DRX mode includes a C-DRX mode.

Beam selection component 1225 may select a second set of transmit beams based on the received set of signals, the second set of transmit beams including two or more transmit beams, and the two or more transmit beams being different from the first set of transmit beams and select a transmit beam from the second set of transmit beams for the UE to use to receive downlink transmissions from the base station.

Indication manager 1230 may transmit an indication of the selected second set of transmit beams to the base station and transmit an indication of the selected transmit beam to the base station. In some cases, transmitting the indication of the selected second set of transmit beams includes: transmitting a beam recovery signal that identifies the selected second set of transmit beams. Indication manager 1230 may transmit a beam recovery signal that identifies the selected transmit beam.

Signal reception component 1235 may receive, based on receiving the wakeup signal, a set of signals transmitted by the base station using a second set of transmit beams, the set of signals including reference signals, or synchronization signals, or a combination thereof and receive the downlink transmissions transmitted by the base station using the selected transmit beam, where the downlink transmissions include a PDCCH, or a resource grant, or downlink data, or a combination thereof. In some cases, a number of the second transmit beams is greater than a number of the first set of transmit beams. Signal reception component 1235 may also receiving a configuration of periodic CSI-RS resources and receive at least one of the CSI-RSs during a CSI-RS resource of the periodic CSI-RS resources.

UE wakeup signal component 1240 may receive a wakeup signal from the base station, the wakeup signal received using at least one transmit beam of the second set of transmit beams. In some cases, the wakeup signal includes a narrowband tone, or a UE-specific reference signal, or a PDCCH including a plurality of cyclic redundancy check (CRC) bits scrambled by a C-RNTI of the UE, or a combination thereof.

Signal quality component 1245 may determine a signal quality associated with the received first set of signals, where identifying the second set of transmit beams is based on a signal quality threshold. Signal quality component 1245 may determine a signal quality associated with the decoded set of reference signals, where selecting the transmit beam is based on a signal quality threshold. Decoder 1250 may decode the set of signals, where the set of signals are encoded using a code rate that is higher than a code rate used to encode the wakeup signal. Signal quality component 1245 may also determining, for each transmit beam of the first set of transmit beams, a signal quality associated with the received first set of signals, where beam selection component 1225 may select the transmit beam based on a signal quality threshold. Signal quality component 1245 may determining that a signal quality for each transmit beam of the first set of transmit beams is below a signal quality threshold, where beam selection component 1225 may select the transmit beam based at least in part on the determining. In some cases, the reference signals include DMRSs, TRSs, PC-RSs, or CSI-RSs, or a combination thereof. In some cases, the synchronization signals include PSSs, SSSs, DMRSs, PBCH signals, or a combination thereof. In some cases, the DRX mode includes a C-DRX mode. Signal quality component 1245 may also determine that a signal quality associated with the received at least one CSI-RS is below a signal quality threshold, wherein selecting the second set of transmit beams is based at least in part on the determination, where signal reception component 1235 may receive a signal from the base station using at least one transmit beam of the second set of transmit beams based at least in part on the determination.

Figure 13:
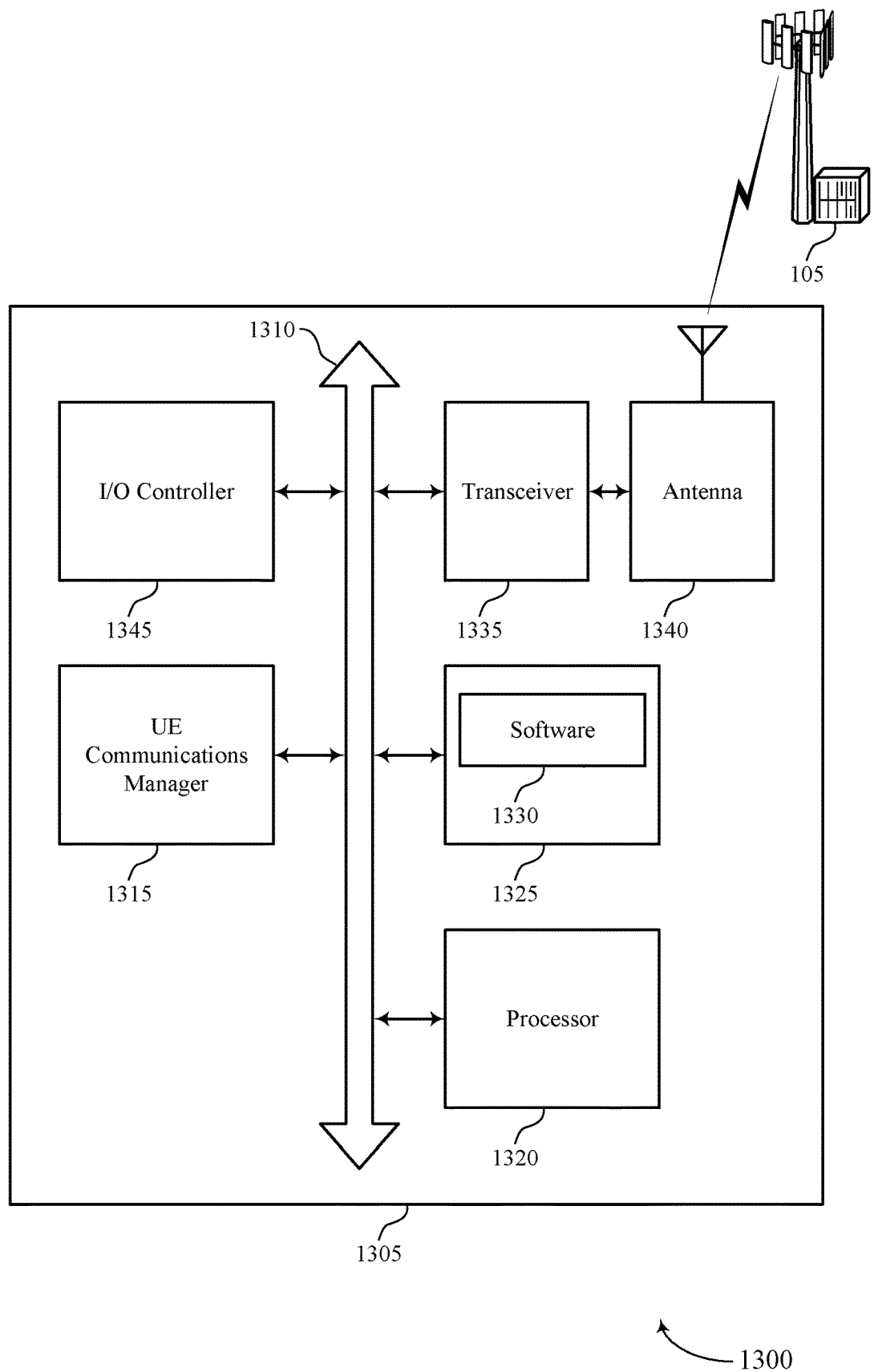
FIG. 13 illustrates a block diagram of a system including a UE that supports beam management in accordance with aspects of the present disclosure.

FIG. 13 shows a diagram of a system 1300 including a device 1305 that supports beam management in accordance with aspects of the present disclosure. Device 1305 may be an example of or include the components of UE 115 as described above, e.g., with reference to FIG. 1. Device 1305 may include components for bi-directional voice and data communications including components for transmitting and receiving communications, including UE communications manager 1315, processor 1320, memory 1325, software 1330, transceiver 1335, antenna 1340, and I/O controller 1345. These components may be in electronic communication via one or more buses (e.g., bus 1310). Device 1305 may communicate wirelessly with one or more base stations 105.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting beam management for beam-swept wakeup signals).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support beam management for beam-swept wakeup signals. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions.

I/O controller 1345 may manage input and output signals for device 1305. I/O controller 1345 may also manage peripherals not integrated into device 1305. In some cases, I/O controller 1345 may represent a physical connection or port to an external peripheral. In some cases, I/O controller 1345 may utilize an operating system such as iOS®, ANDROID®, MS-DOS®, MS-WINDOWS®, OS/2®, UNIX®, LINUX®, or another known operating system. In other cases, I/O controller 1345 may represent or interact with a modem, a keyboard, a mouse, a touchscreen, or a similar device. In some cases, I/O controller 1345 may be implemented as part of a processor. In some cases, a user may interact with device 1305 via I/O controller 1345 or via hardware components controlled by I/O controller 1345.

Figure 14:
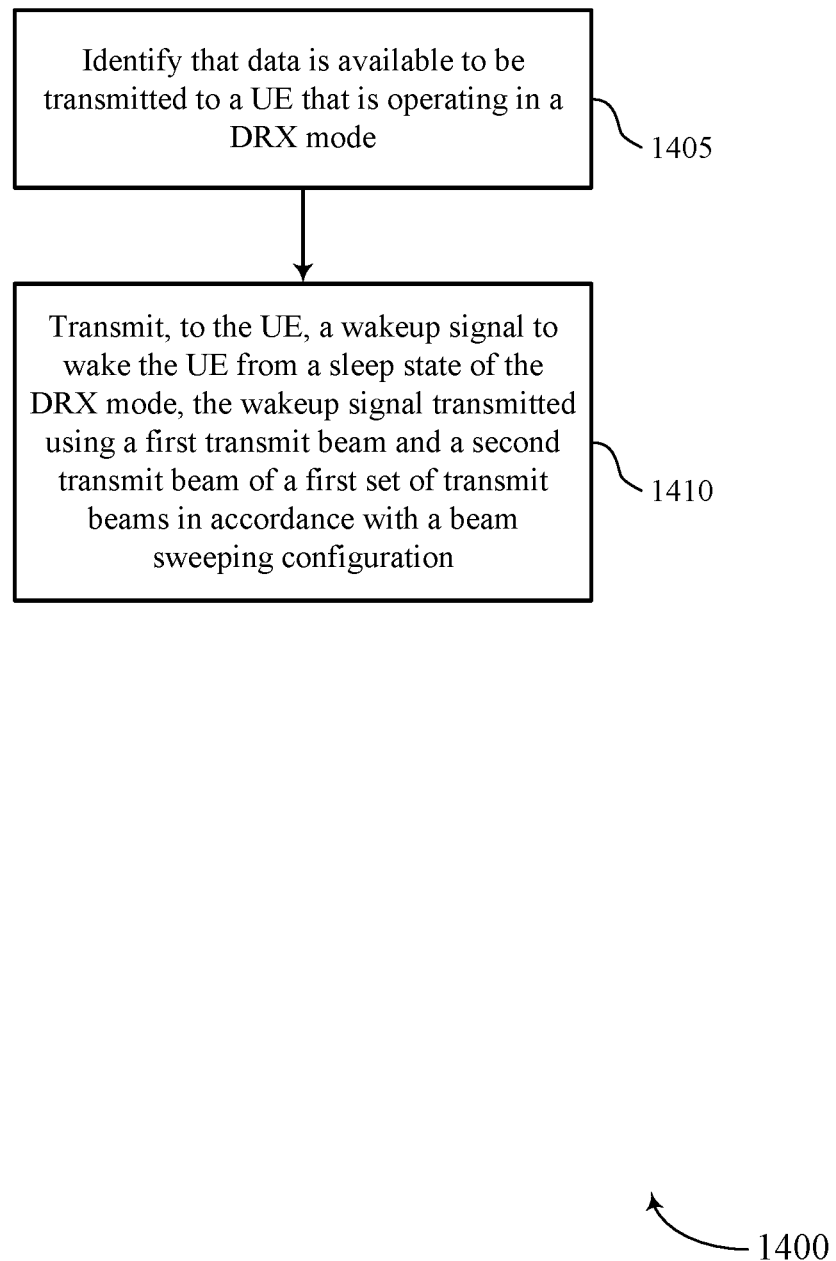
FIGS. 14 through 20 illustrate methods for beam management in accordance with aspects of the present disclosure.

FIG. 14 shows a flowchart illustrating a method 1400 for beam management in accordance with aspects of the present disclosure. The operations of method 1400 may be implemented by a base station 105 or its components as described herein. For example, the operations of method 1400 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1405 the base station 105 may identify that data is available to be transmitted to a UE 115 that is operating in a DRX mode (e.g., a C-DRX mode). The operations of block 1405 may be performed according to the methods described herein. In certain examples, aspects of the operations of block 1405 may be performed by an available data manager as described with reference to FIGS. 6 through 9.

At block 1410 the base station 105 may transmit, to the UE 115, a wakeup signal to wake the UE from a sleep state of the DRX mode, the wakeup signal transmitted using a first transmit beam and a second transmit beam of a first set of transmit beams in accordance with a beam sweeping configuration. The operations of block 1410 may be performed according to the methods described herein. In certain examples, aspects of the operations of block 1410 may be performed by a base station wakeup signal component as described with reference to FIGS. 6 through 9.

Figure 15:
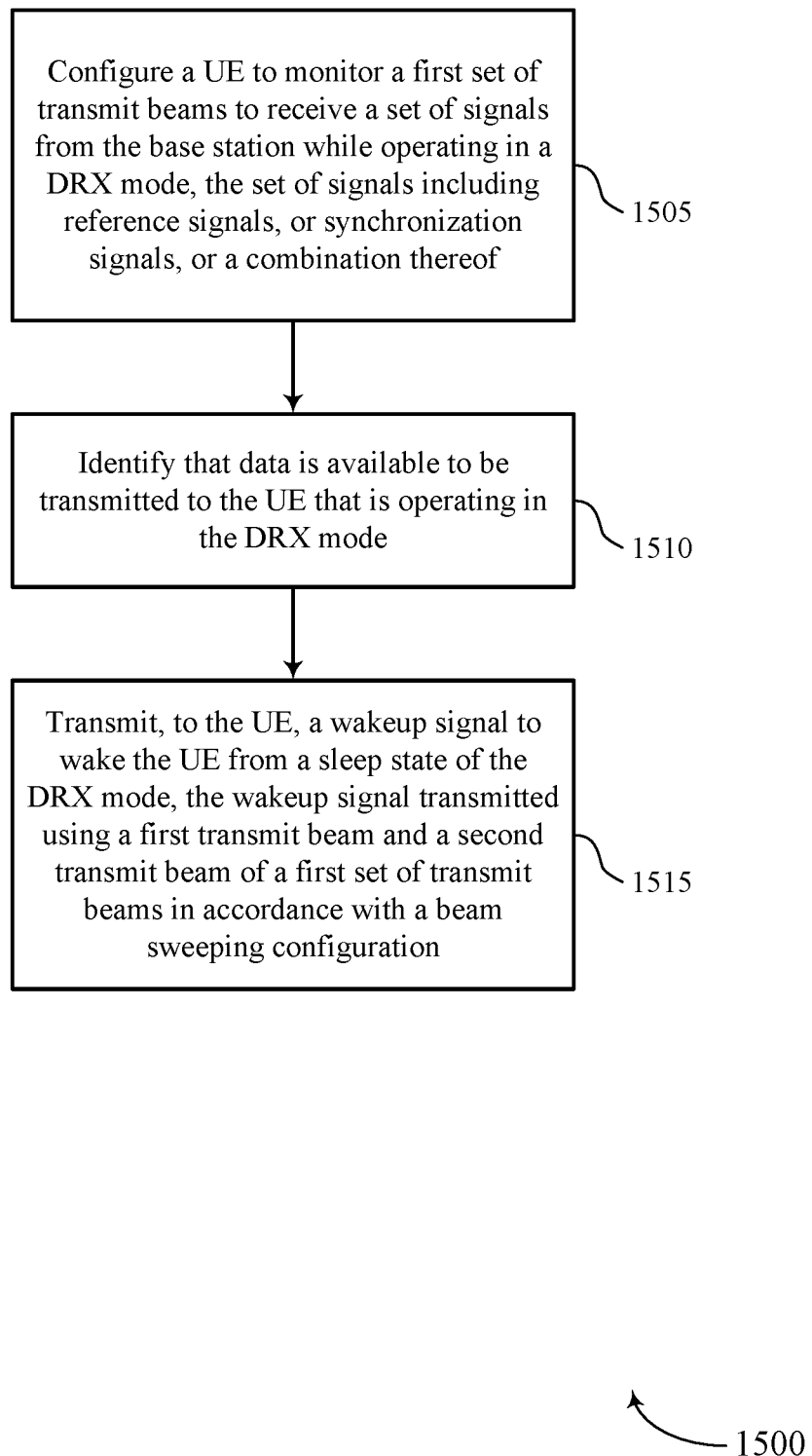

FIG. 15 shows a flowchart illustrating a method 1500 for beam management in accordance with aspects of the present disclosure. The operations of method 1500 may be implemented by a base station 105 or its components as described herein. For example, the operations of method 1500 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1505 the base station 105 may configure the UE 115 to monitor the first set of transmit beams to receive a set of signals from the base station while operating in a DRX mode, the set of signals comprising reference signals, or synchronization signals, or a combination thereof. The operations of block 1505 may be performed according to the methods described herein. In certain examples, aspects of the operations of block 1505 may be performed by a beam monitoring configuration component as described with reference to FIGS. 6 through 9.

At block 1510 the base station 105 may identify that data is available to be transmitted to the UE 115 that is operating in the DRX mode. The operations of block 1510 may be performed according to the methods described herein. In certain examples, aspects of the operations of block 1510 may be performed by an available data manager as described with reference to FIGS. 6 through 9.

At block 1515 the base station 105 may transmit, to the UE 115, a wakeup signal to wake the UE 115 from a sleep state of the DRX mode, the wakeup signal transmitted using a first transmit beam and a second transmit beam of a first set of transmit beams in accordance with a beam sweeping configuration. The operations of block 1515 may be performed according to the methods described herein. In certain examples, aspects of the operations of block 1515 may be performed by a base station wakeup signal component as described with reference to FIGS. 6 through 9.

Figure 16:
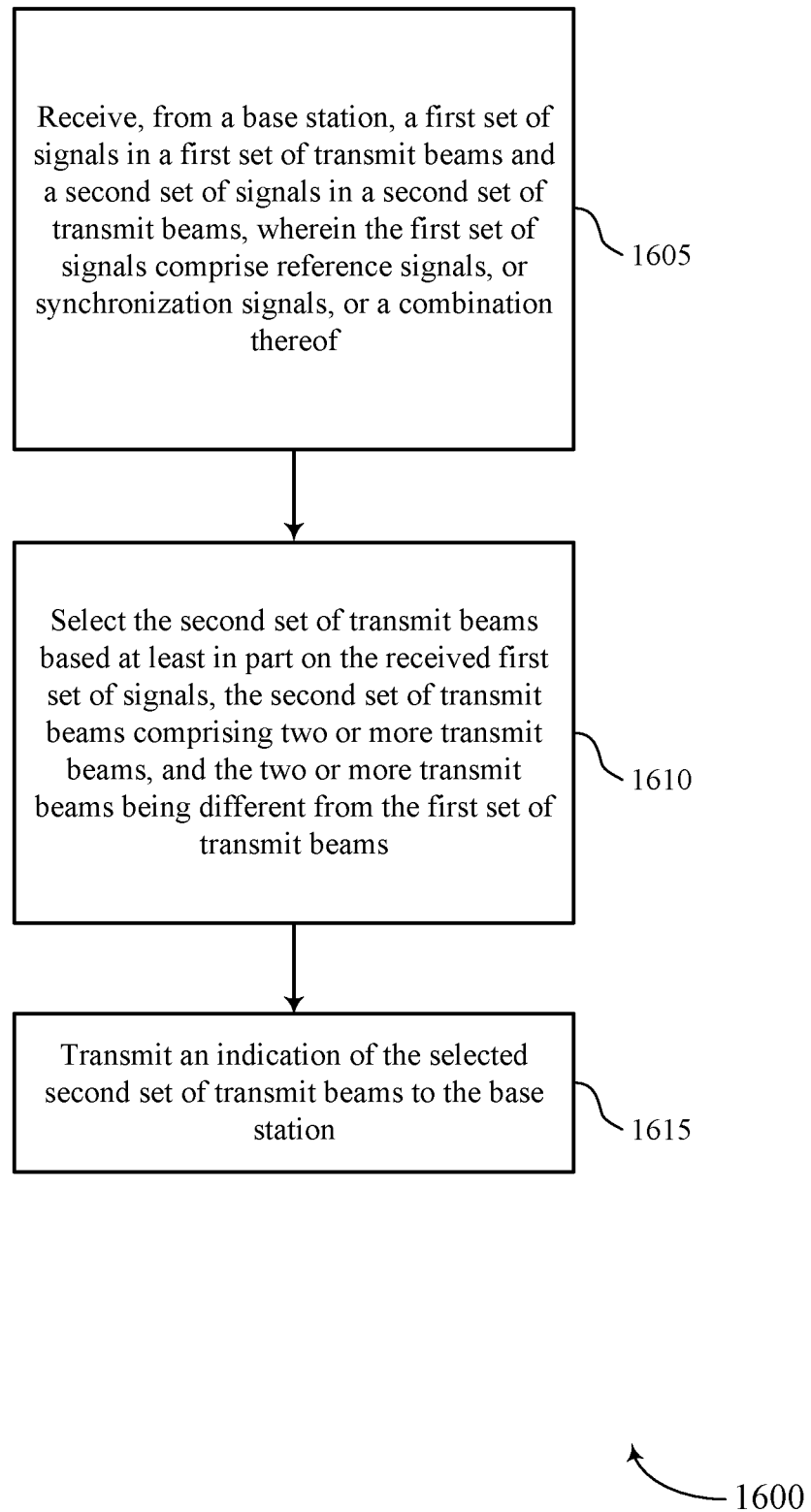

FIG. 16 shows a flowchart illustrating a method 1600 for beam management in accordance with aspects of the present disclosure. The operations of method 1600 may be implemented by a UE 115 or its components as described herein. For example, the operations of method 1600 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive, from a base station while operating in a discontinuous reception (DRX) mode, a first set of signals in a first set of transmit beams and a second set of signals in a second set of transmit beams, wherein the first set of signals comprise reference signals or synchronization signals, or a combination thereof. The operations of block 1605 may be performed according to the methods described herein. In certain examples, aspects of the operations of block 1605 may be performed by a DRX manager as described with reference to FIGS. 10 through 13.

At block 1610 the UE 115 may select the second set of transmit beams based at least in part on the received first set of signals, the second set of transmit beams comprising two or more transmit beams, and the two or more transmit beams being different from the first set of transmit beams. The operations of block 1610 may be performed according to the methods described herein. In certain examples, aspects of the operations of block 1610 may be performed by a beam selection component as described with reference to FIGS. 10 through 13.

At block 1615 the UE 115 may transmit an indication of the selected second set of transmit beams to the base station. The operations of block 1615 may be performed according to the methods described herein. In certain examples, aspects of the operations of block 1615 may be performed by an indication manager as described with reference to FIGS. 10 through 13.

Figure 17:
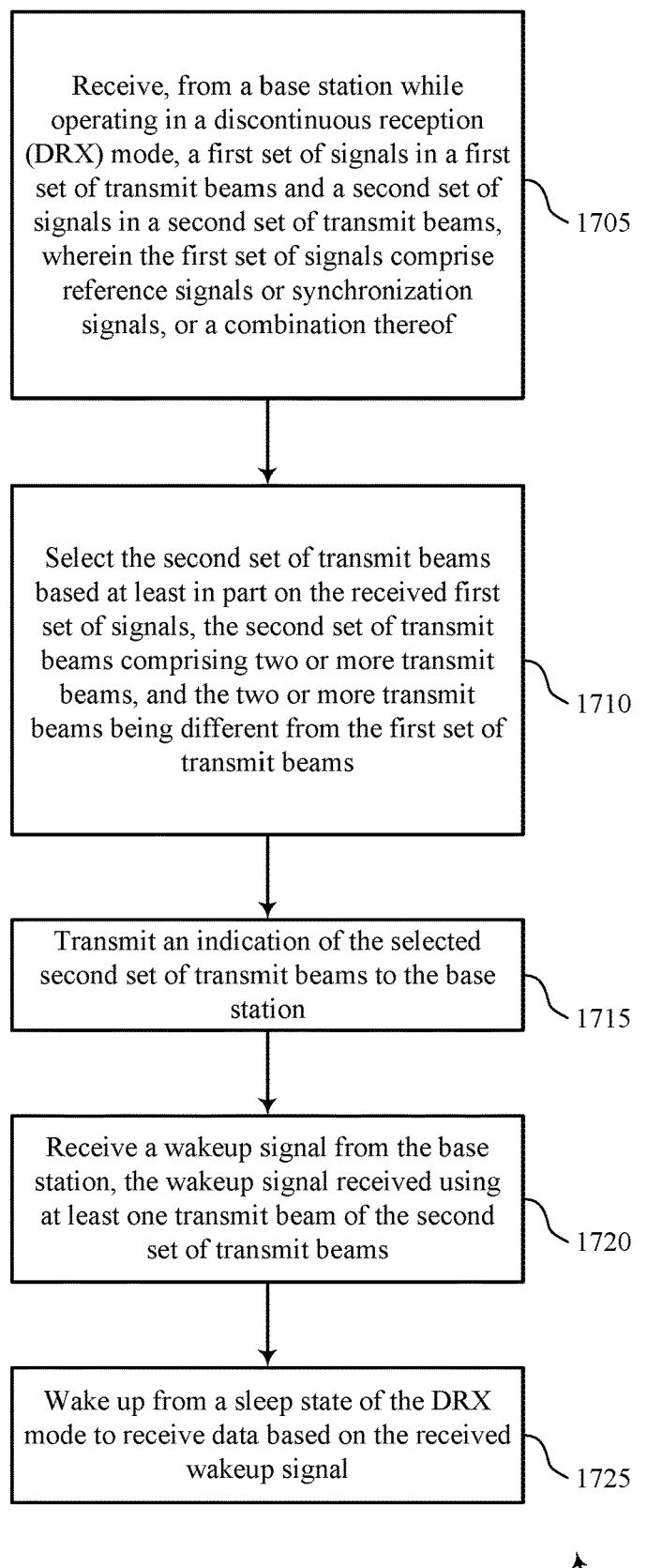

FIG. 17 shows a flowchart illustrating a method 1700 for beam management in accordance with aspects of the present disclosure. The operations of method 1700 may be implemented by a UE 115 or its components as described herein. For example, the operations of method 1700 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may receive, from a base station while operating in a discontinuous reception (DRX) mode, a first set of signals in a first set of transmit beams and a second set of signals in a second set of transmit beams, wherein the first set of signals comprise reference signals or synchronization signals, or a combination thereof. The operations of block 1705 may be performed according to the methods described herein. In certain examples, aspects of the operations of block 1705 may be performed by a DRX manager as described with reference to FIGS. 10 through 13.

At block 1710 the UE 115 may select the second set of transmit beams based at least in part on the received first set of signals, the second set of transmit beams comprising two or more transmit beams, and the two or more transmit beams being different from the first set of transmit beams. The operations of block 1710 may be performed according to the methods described herein. In certain examples, aspects of the operations of block 1710 may be performed by a beam selection component as described with reference to FIGS. 10 through 13.

At block 1715 the UE 115 may transmit an indication of the selected second set of transmit beams to the base station. The operations of block 1715 may be performed according to the methods described herein. In certain examples, aspects of the operations of block 1715 may be performed by an indication manager as described with reference to FIGS. 10 through 13.

At block 1720 the UE 115 may receive a wakeup signal from the base station, the wakeup signal received using at least one transmit beam of the second set of transmit beams. The operations of block 1720 may be performed according to the methods described herein. In certain examples, aspects of the operations of block 1720 may be performed by a UE wakeup signal component as described with reference to FIGS. 10 through 13.

At block 1725 the UE 115 may wake up from a sleep state of the DRX mode to receive data based at least in part on the received wakeup signal. The operations of block 1725 may be performed according to the methods described herein. In certain examples, aspects of the operations of block 1725 may be performed by a DRX manager as described with reference to FIGS. 10 through 13.

Figure 18:
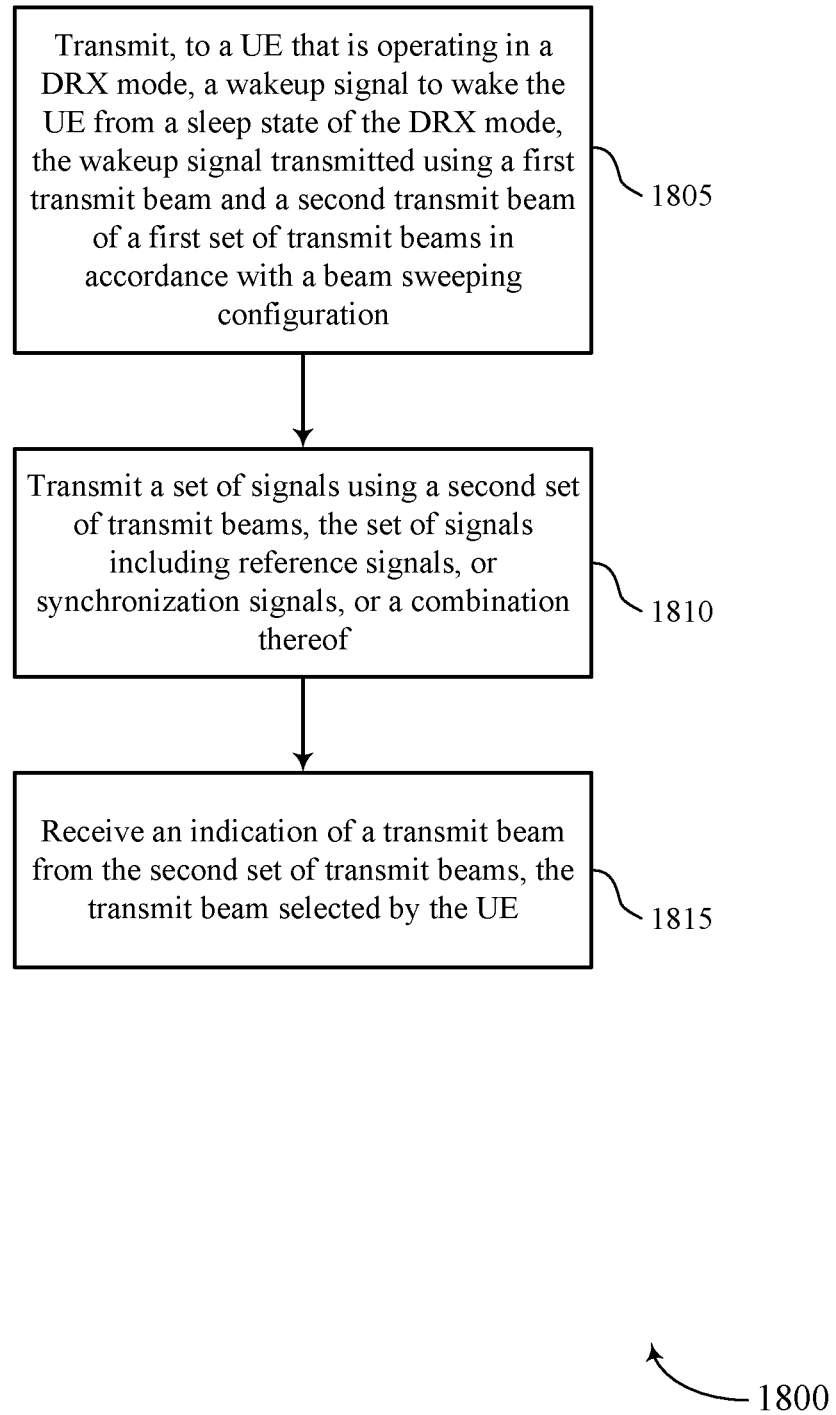

FIG. 18 shows a flowchart illustrating a method 1800 for beam management in accordance with aspects of the present disclosure. The operations of method 1800 may be implemented by a base station 105 or its components as described herein. For example, the operations of method 1800 may be performed by a base station communications manager as described with reference to FIGS. 6 through 9. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may transmit, to a user equipment (UE) that is operating in a discontinuous reception (DRX) mode, a wakeup signal to wake the UE from a sleep state of the DRX mode, the wakeup signal transmitted using a first transmit beam and a second transmit beam of a first set of transmit beams in accordance with a beam sweeping configuration. The operations of block 1805 may be performed according to the methods described herein. In certain examples, aspects of the operations of block 1805 may be performed by a base station wakeup signal component as described with reference to FIGS. 6 through 9.

At block 1810 the base station 105 may transmit a set of signals using a second set of transmit beams, the set of signals comprising reference signals, or synchronization signals, or a combination thereof. The operations of block 1810 may be performed according to the methods described herein. In certain examples, aspects of the operations of block 1810 may be performed by a signaling component as described with reference to FIGS. 6 through 9.

At block 1815 the base station 105 may receive an indication of a transmit beam from the second set of transmit beams, the transmit beam selected by the UE. The operations of block 1815 may be performed according to the methods described herein. In certain examples, aspects of the operations of block 1815 may be performed by a transmit beam manager as described with reference to FIGS. 6 through 9.

Figure 19:
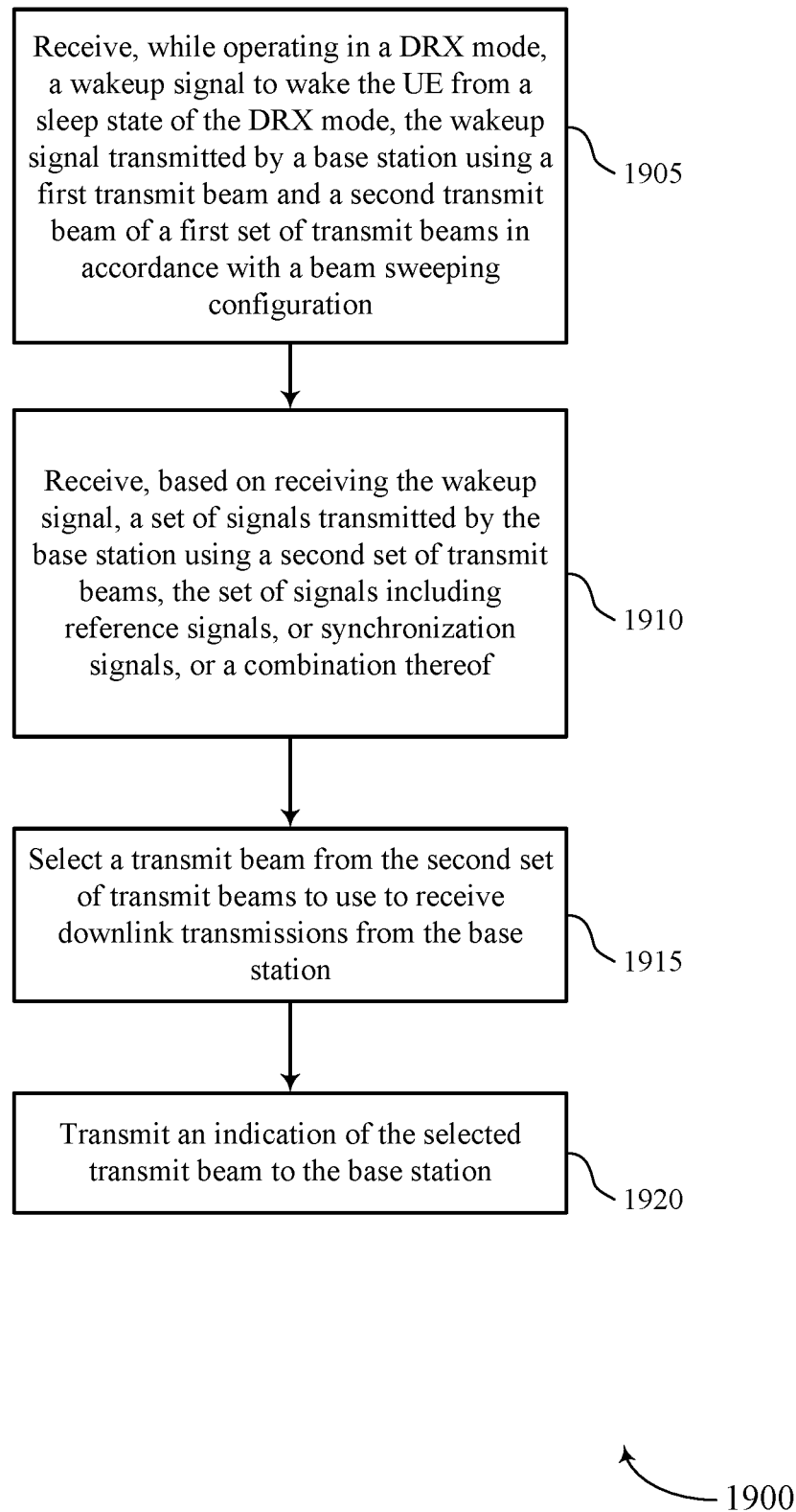

FIG. 19 shows a flowchart illustrating a method 1900 for beam management in accordance with aspects of the present disclosure. The operations of method 1900 may be implemented by a UE 115 or its components as described herein. For example, the operations of method 1900 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may receive, while operating in a DRX mode, a wakeup signal to wake the UE from a sleep state of the DRX mode, the wakeup signal transmitted by a base station using a first transmit beam and a second transmit beam of a first set of transmit beams in accordance with a beam sweeping configuration. The operations of block 1905 may be performed according to the methods described herein. In certain examples, aspects of the operations of block 1905 may be performed by a DRX manager as described with reference to FIGS. 10 through 13.

At block 1910 the UE 115 may receive, based at least in part on receiving the wakeup signal, a set of signals transmitted by the base station using a second set of transmit beams, the set of signals comprising reference signals, or synchronization signals, or a combination thereof. The operations of block 1910 may be performed according to the methods described herein. In certain examples, aspects of the operations of block 1910 may be performed by a signal reception component as described with reference to FIGS. 10 through 13.

At block 1915 the UE 115 may select a transmit beam from the second set of transmit beams for the UE to use to receive downlink transmissions from the base station. The operations of block 1915 may be performed according to the methods described herein. In certain examples, aspects of the operations of block 1915 may be performed by a beam selection component as described with reference to FIGS. 10 through 13.

At block 1920 the UE 115 may transmit an indication of the selected transmit beam to the base station. The operations of block 1920 may be performed according to the methods described herein. In certain examples, aspects of the operations of block 1920 may be performed by an indication manager as described with reference to FIGS. 10 through 13.

Figure 20:
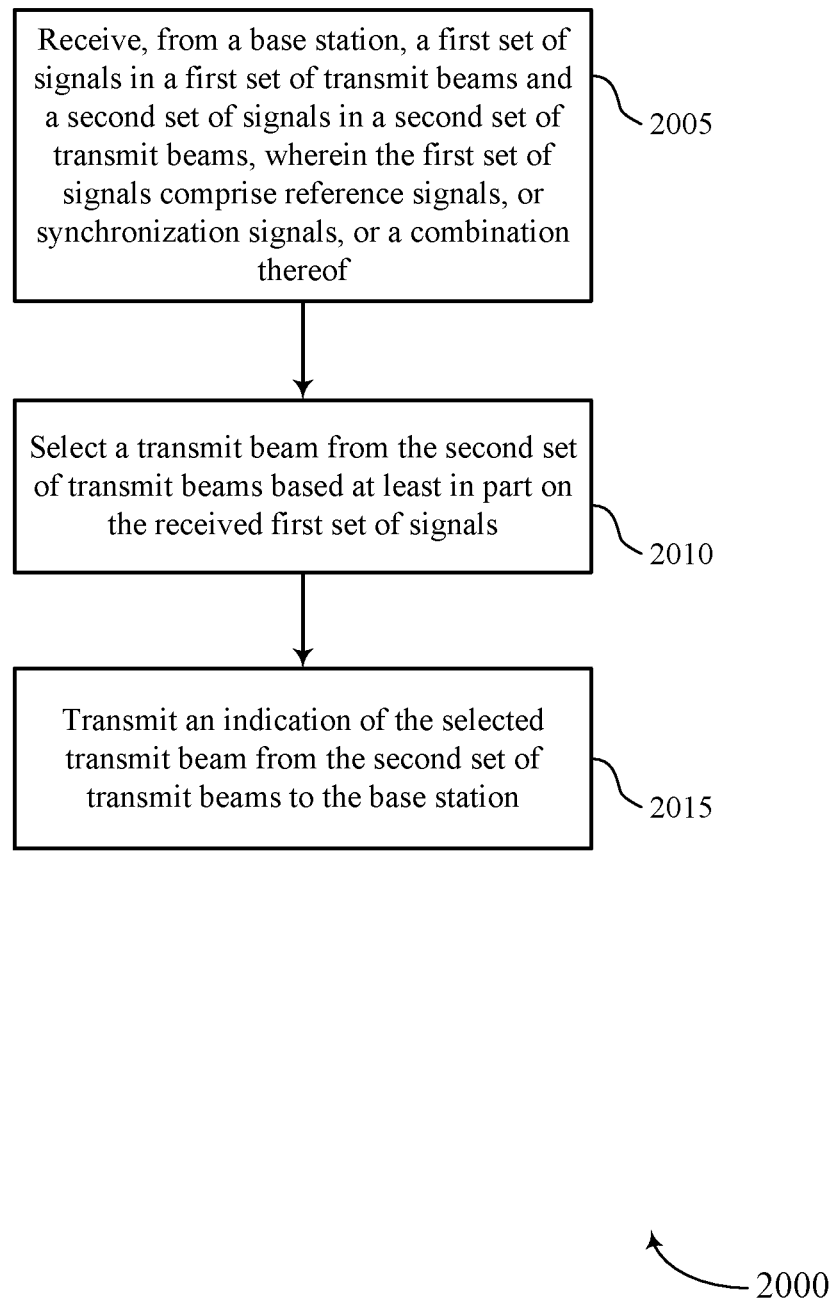

FIG. 20 shows a flowchart illustrating a method 2000 for beam management in accordance with aspects of the present disclosure. The operations of method 2000 may be implemented by a UE 115 or its components as described herein. For example, the operations of method 2000 may be performed by a UE communications manager as described with reference to FIGS. 10 through 13. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may receive, from a base station, a first set of signals in a first set of transmit beams and a second set of signals in a second set of transmit beams, wherein the first set of signals comprise reference signals, or synchronization signals, or a combination thereof. The operations of block 2005 may be performed according to the methods described herein. In certain examples, aspects of the operations of block 2005 may be performed by a DRX manager as described with reference to FIGS. 10 through 13.

At block 2010 the UE 115 may select a transmit beam from the second set of transmit beams based at least in part on the received first set of signals. The operations of block 2010 may be performed according to the methods described herein. In certain examples, aspects of the operations of block 2010 may be performed by a signal reception component as described with reference to FIGS. 10 through 13.

At block 2015 the UE 115 may transmit an indication of the selected transmit beam from the second set of transmit beams to the base station. The operations of block 2015 may be performed according to the methods described herein. In certain examples, aspects of the operations of block 2015 may be performed by a beam selection component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station while operating in a discontinuous reception (DRX) mode, a first set of signals in a first set of downlink transmit beams and a second set of signals in a second set of downlink transmit beams, wherein the first set of signals comprise reference signals or synchronization signals, or a combination thereof;
   selecting the second set of downlink transmit beams based at least in part on the received first set of signals, the second set of downlink transmit beams comprising two or more downlink transmit beams, and the two or more downlink transmit beams being different from the first set of downlink transmit beams;
   transmitting, via a set of uplink transmit beams that correspond to the second set of downlink transmit beams, an indication of the selected second set of downlink transmit beams to the base station;
   receiving a wakeup signal from the base station, the wakeup signal received using at least one downlink transmit beam of the second set of downlink transmit beams; and
   waking up from a sleep state of the DRX mode to receive a control channel transmission scheduling data channel resources based at least in part on the received wakeup signal.

2. The method of claim 1, wherein the wakeup signal comprises a narrowband tone, or a UE-specific reference signal, or a physical downlink control channel (PDCCH) including a plurality of cyclic redundancy check (CRC) bits scrambled by a C-RNTI of the UE, or a combination thereof.

3. The method of claim 1, further comprising:
   determining a signal quality associated with the received first set of signals, wherein selecting the second set of downlink transmit beams is based on a signal quality threshold.

4. The method of claim 1, wherein transmitting the indication of the selected second set of downlink transmit beams comprises:
   transmitting a beam recovery signal that identifies the selected second set of downlink transmit beams.

5. The method of claim 1, wherein:
   the reference signals comprise demodulation reference signals (DMRSs), tracking reference signals (TRSs), phase compensation reference signals (PC-RSs), or channel state information reference signals (CSI-RSs), or a combination thereof; and
   the synchronization signals comprise primary synchronization signals (PSSs), secondary synchronization signals (SSSs), demodulation reference signals (DMRSs), physical broadcast channel (PBCH) signals, or a combination thereof.

6. The method of claim 1, wherein the DRX mode comprises a connected DRX (C-DRX) mode.

7. A method for wireless communication at a user equipment (UE), comprising:
receiving, from a base station, a first set of channel state information-reference signals (CSI-RSs) in a first set of transmit beams and a second set of CSI-RSs in a second set of transmit beams, wherein one or more of the first set of CSI-RSs and one or more of the second set of CSI-RSs are received during a discontinuous reception (DRX)-off period configured for the UE;
determining that a signal quality associated with at least one received CSI-RS of the first set of CSI-RSs is below a signal quality threshold;
selecting a transmit beam from the second set of transmit beams based at least in part on the determining; and
transmitting an indication of the selected transmit beam from the second set of transmit beams to the base station.

8. The method of claim 7, wherein transmitting the indication of the selected transmit beam comprises transmitting a beam recovery signal that identifies the selected transmit beam.

9. The method of claim 7, further comprising:
determining, for each transmit beam of the first set of transmit beams, a signal quality associated with the received first set of signals, wherein the transmit beam is selected based on the signal quality being below a signal quality threshold.

10. The method of claim 7, further comprising:
receiving, using the selected transmit beam from the second set of transmit beams, signals from the base station in response to the transmitted indication.

11. The method of claim 7, wherein:
demodulation reference signals (DMRSs), tracking reference signals (TRSs), phase compensation reference signals (PC-RSs), or a combination thereof are received in the first set of transmit beams and the second set of transmit beams; and
synchronization signals comprising primary synchronization signals (PSSs), secondary synchronization signals (SSSs), demodulation reference signals (DMRSs), physical broadcast channel (PBCH) signals, or a combination thereof are received in the first set of transmit beams and the second set of transmit beams.

12. The method of claim 7, further comprising:
receiving a configuration of periodic CSI-RS resources, wherein the configuration of the periodic CSI-RS resources comprises the first set of CSI-RSs and the second set of CSI-RSs; and
receiving at least one of the first set of CSI-RSs or the second set of CSI-RSs during a CSI-RS resource of the periodic CSI-RS resources.

13. The method of claim 12, further comprising:
receiving a signal from the base station using at least one transmit beam of the second set of transmit beams based at least in part on the determination.

14. A user equipment (UE), comprising:
a processor;
memory in electronic communication with the processor; and
instructions stored in the memory, the instructions operable to cause the processor perform operations comprising:
selecting the second set of downlink transmit beams based at least in part on the received first set of signals, the second set of downlink transmit beams comprising two or more downlink transmit beams, and the two or more downlink transmit beams being different from the first set of downlink transmit beams;
transmitting, via a set of uplink transmit beams that correspond to the second set of downlink transmit beams, an indication of the selected second set of downlink transmit beams to the base station;
receiving a wakeup signal from the base station, the wakeup signal received using at least one downlink transmit beam of the second set of downlink transmit beams; and
waking up from a sleep state of the DRX mode to receive a control channel transmission scheduling data channel resources based at least in part on the received wakeup signal.

15. The user equipment of claim 14, wherein the wakeup signal comprises a narrowband tone, or a UE-specific reference signal, or a physical downlink control channel (PDCCH) including a plurality of cyclic redundancy check (CRC) bits scrambled by a C-RNTI of the UE, or a combination thereof.

16. The user equipment of claim 14, the operations further comprising:
determining a signal quality associated with the received first set of signals, wherein selecting the second set of downlink transmit beams is based on a signal quality threshold.

17. The user equipment of claim 14, wherein transmitting the indication of the selected second set of downlink transmit beams comprises:
transmitting a beam recovery signal that identifies the selected second set of downlink transmit beams.

18. The user equipment of claim 14, wherein:
the reference signals comprise demodulation reference signals (DMRSs), tracking reference signals (TRSs), phase compensation reference signals (PC-RSs), or channel state information reference signals (CSI-RSs), or a combination thereof; and
the synchronization signals comprise primary synchronization signals (PSSs), secondary synchronization signals (SSSs), demodulation reference signals (DMRSs), physical broadcast channel (PBCH) signals, or a combination thereof.

19. The user equipment of claim 14, wherein the DRX mode comprises a connected DRX (C-DRX) mode.

20. A user equipment (UE) comprising:
a processor;
memory in electronic communication with the processor; and
instructions stored in the memory, the instructions operable to cause the processor perform operations comprising:
receiving, from a base station, a first set of channel state information-reference signals (CSI-RSs) in a first set of transmit beams and a second set of CSI-RSs in a second set of transmit beams, wherein one or more of the first set of CSI-RSs and one or more of the second set of CSI-RSs are received during a discontinuous reception (DRX)-off period configured for the UE;
determining that a signal quality associated with at least one received CSI-RS of the first set of CSI-RSs is below a signal quality threshold;
selecting a transmit beam from the second set of transmit beams based at least in part on the determining; and
transmitting an indication of the selected transmit beam from the second set of transmit beams to the base station.

21. The user equipment of claim 20, wherein transmitting the indication of the selected transmit beam comprises transmitting a beam recovery signal that identifies the selected transmit beam.

22. The user equipment of claim 20, the operations further comprising:
determining, for each transmit beam of the first set of transmit beams, a signal quality associated with the received first set of signals, wherein the transmit beam is selected based on the signal quality being below a signal quality threshold.

23. The user equipment of claim 20, the operations further comprising:
receiving, using the selected transmit beam from the second set of transmit beams, signals from the base station in response to the transmitted indication.

24. The user equipment of claim 20, wherein:
demodulation reference signals (DMRSs), tracking reference signals (TRSs), phase compensation reference signals (PC-RSs), or a combination thereof are received in the first set of transmit beams and the second set of transmit beams; and
synchronization signals comprising primary synchronization signals (PSSs), secondary synchronization signals (SSSs), demodulation reference signals (DMRSs), physical broadcast channel (PBCH) signals, or a combination thereof are received in the first set of transmit beams and the second set of transmit beams.

25. The user equipment of claim 20, the operations further comprising:
receiving a configuration of periodic CSI-RS resources, wherein the configuration of the periodic CSI-RS resources comprises the first set of CSI-RSs and the second set of CSI-RSs; and
receiving at least one of the first set of CSI-RSs or the second set of CSI-RSs during a CSI-RS resource of the periodic CSI-RS resources.

26. The user equipment of claim 25, the operations further comprising: receiving a signal from the base station using at least one transmit beam of the second set of transmit beams based at least in part on the determination.

\* \* \* \* \*